US011743357B2

(12) United States Patent
Ren et al.

(10) Patent No.: US 11,743,357 B2
(45) Date of Patent: Aug. 29, 2023

(54) MESSAGE PUSHING METHOD, STORAGE MEDIUM, AND SERVER

(71) Applicant: Tencent Technology (Shenzhen) Company Limited, Guangdong (CN)

(72) Inventors: Yan Ren, Shenzhen (CN); Yuwen Wang, Shenzhen (CN); Meng Lv, Shenzhen (CN); Ting Jia, Shenzhen (CN); Zexiang Zhao, Shenzhen (CN)

(73) Assignee: Tencent Technologies (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 17/402,135

(22) Filed: Aug. 13, 2021

(65) Prior Publication Data

US 2021/0377355 A1 Dec. 2, 2021

Related U.S. Application Data

(63) Continuation of application No. PCT/CN2020/096640, filed on Jun. 17, 2020.

(30) Foreign Application Priority Data

Jul. 2, 2019 (CN) .......................... 201910589563.1

(51) Int. Cl.
*H04L 12/70* (2013.01)
*H04L 67/55* (2022.01)
*H04L 67/12* (2022.01)
(52) U.S. Cl.
CPC .............. *H04L 67/55* (2022.05); *H04L 67/12* (2013.01)

(58) Field of Classification Search
CPC ......... H04L 67/55; H04L 67/12; H04L 67/51; G06F 16/9537
(Continued)

(56) References Cited

U.S. PATENT DOCUMENTS 8,167,430 B2 * 5/2012 Cobb ................... G06V 10/955
352/52
9,183,676 B2 * 11/2015 McCulloch ........... G06T 19/006
(Continued)

FOREIGN PATENT DOCUMENTS

CN 105513395 A 4/2016
CN 106649502 A 5/2017
(Continued)

OTHER PUBLICATIONS

International Search Report and Written Opinion for priority application No. PCT/CN2020/096640, dated Aug. 24, 2020, 7p, in Chinese language.
(Continued)

*Primary Examiner* — Ario Etienne
*Assistant Examiner* — Elizabeth Kassa
(74) *Attorney, Agent, or Firm* — Crowell & Moring LLP

(57) ABSTRACT

A message pushing method, a storage medium, and a server are disclosed in this disclosure, belonging to the field of Internet of Vehicles. The method includes: obtaining basic data associated with a target vehicle; recognizing a current scene of the target vehicle based on the basic data to obtain a scene recognition result; determining, according to the scene recognition result, at least one recommended service for the target vehicle; generating a service message of the at least one recommended service; and pushing the service message to the target vehicle.

20 Claims, 12 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 2007/0138347 | A1* | 6/2007 | Ehlers | G01C 21/34 246/1 R |
| 2014/0012460 | A1* | 1/2014 | Kleinschmidt | G07C 5/00 701/31.5 |
| 2014/0279707 | A1* | 9/2014 | Joshua | G06Q 30/0283 701/1 |
| 2016/0094866 | A1* | 3/2016 | Frazzini | H04N 21/8126 725/10 |
| 2017/0024393 | A1* | 1/2017 | Choksi | G06F 3/0485 |
| 2017/0129426 | A1* | 5/2017 | Smith | B60R 16/037 |
| 2018/0174265 | A1* | 6/2018 | Liu | G06Q 30/0639 |
| 2019/0005464 | A1* | 1/2019 | Harris, III | G06Q 10/20 |
| 2019/0051046 | A1* | 2/2019 | Jin | H04N 23/69 |
| 2019/0197430 | A1* | 6/2019 | Arditi | G06N 20/00 |
| 2020/0117905 | A1* | 4/2020 | Yakupov | G06F 18/40 |
| 2021/0377355 | A1* | 12/2021 | Ren | H04L 67/12 |
| 2022/0126864 | A1* | 4/2022 | Moustafa | G08G 1/163 |

FOREIGN PATENT DOCUMENTS

| | | | | |
|---|---|---|---|---|
| CN | 107205002 | A | * 9/2017 | ............. H04L 67/12 |
| CN | 107358809 | A | 11/2017 | |
| CN | 208028937 | U | 10/2018 | |
| CN | 109376303 | A | 2/2019 | |
| CN | 110300175 | A | 10/2019 | |
| EP | 1 981 182 | A1 | 10/2008 | |
| JP | 2007-272834 | A | 10/2007 | |
| JP | 2013-092948 | A | 5/2013 | |
| JP | 2018-169706 | A | 11/2018 | |
| WO | WO 2018/032196 | A1 | 2/2018 | |
| WO | WO 2021/000734 | A1 | 1/2021 | |

OTHER PUBLICATIONS

English translation of the International Search Report for PCT/CN2020/096640, dated Aug. 28, 2020, 2p.

Rejection Determination for Chinese application No. 201910589563.1, dated Mar. 3, 31, 2021, 7p, in Chinese language.
First Office Action for Chinese application No. 201910589563.1, dated Mar. 4, 2020, 10p, in Chinese language.
Second Office Action for Chinese application No. 201910589563.1, dated Sep. 10, 2020, 8p, in Chinese language.
Concise Explanation of Relevance for the Written Opinion of the International Search Authority, the first Office Action, the second Office Action, and the Rejection Determination for CN 2019105895631.1, "Guidance of Developing Web-Pages" (A17), and "Java Language Practical Guidance" (A18), 2p.
Lan, Yiyong, "Guidance of Developing Web-Pages", Section 4.5, Jun. 30, 2015, ISBN 9787113204693, pp. 95-96.
Ding, Zhenfan, "Java Language Practical Guidance", ISBN 978-7-5635-4814-9, Aug. 2016, 2p.
Wang, Zhongqi, "Research on Advertising Scheduling Model in Vehicle Network Environment" with translation of Abstract, China Master's Theses Full-text Database Information Technology, Hubei University of Technology, Section vol. 11, Nov. 15, 2017, 55p.
Notice of Reasons for Refusal for corresponding application No. JP 2021-545770 dated Sep. 27, 2022, 4p, in Japanese language.
English Language translation of Notice of Reasons for Refusal dated Sep. 27, 2022, 4p.
Intel, "Driver Recognition and Fatigue Detection Systems with Devices Powered by Intel", found on the internet @ https//www.intel.com/content/www/us/en/developer/articles/technical/driver-recognition-and-fatigue-detection-systems-with-devices-powered-by-intel.htmi., 4p, May 12, 2017.
Extended European Search Report for application No. EP 20834583.5 dated Jul. 20, 2022, 10p.
Communication pursuant to Rules 70(2) and 70a(2) re Supplementary European Search Report for application No. EP 20834583.5 dated Aug. 9, 2022, 1p.
Request for the Submission of an Opinion for corresponding application No. KR 9-5-2022-087877175 dated Nov. 14, 2022, 6p, in Korean language.
English language translation of the Request for the Submission of an Opinion for corresponding Korean application No. KR 9-5-2022-087877175 dated Nov. 14, 2022, 6p.

* cited by examiner

MESSAGE PUSHING METHOD, STORAGE MEDIUM, AND SERVER

RELATED APPLICATIONS

This application is continuation of PCT Application No. PCT/CN2020/096640, entitled "MESSAGE PUSHING METHOD, STORAGE MEDIUM, AND SERVER" and filed on Jun. 17, 2020, which claims priority to Chinese Patent Application No. 201910589563.1, entitled "MESSAGE PUSHING METHOD AND APPARATUS, STORAGE MEDIUM, AND SERVER" filed on Jul. 2, 2019. The above applications are incorporated by reference in their entireties.

TECHNICAL FIELD

This disclosure relates to the field of Internet of Vehicles (IoV), and in particular, to a message pushing method, a storage medium, and a server.

BACKGROUND

As the integration of Internet of Things and Internet, the IoV is a part of the current vehicle driving field. In short, the IoV is a huge network for wireless communication and information exchange between vehicles and everything (such as vehicles and vehicles, vehicles and road, vehicles and people, or vehicles and network) based on the network and according to agreed communication protocols and data exchange standards. For example, intelligent traffic management, dynamic message service, and intelligent vehicle control can be realized based on the IoV.

In the related art, when an IoV platform provides a service in the form of a message for a user, the user is further required to manually operate or initiate a voice instruction in a vehicular environment to awaken the service. However, such a service obtaining mode in the vehicular environment will undoubtedly affect the safe driving of the user. Therefore, considering the continuous improvement of driving safety and user demands in the vehicular environment, how to push messages to users in the vehicular environment has become a problem to be resolved by technical personnel in this field.

SUMMARY

Embodiments of this disclosure provide a message pushing method, a storage medium, and a server, which can improve driving safety in a vehicular environment and satisfies service demands of users in the vehicular environment, and has better effects. The technical solutions are as follows.

According to one aspect, a message pushing method is provided, applicable to a server, the method including:

obtaining basic data associated with a target vehicle, the basic data comprising at least vehicle and user data and driving environment data;

recognizing a current scene of the target vehicle based on the basic data to obtain a scene recognition result;

determining, according to the scene recognition result, at least one recommended service for the target vehicle;

generating a service message of the at least one recommended service; and pushing the service message to the target vehicle.

According to another aspect, a message pushing apparatus is provided, applicable to a server, the apparatus including:

an obtaining module, configured to obtain basic data associated with a target vehicle, the basic data including at least vehicle and user data and driving environment data;

a recognition module, configured to recognize a current scene of the target vehicle based on the obtained basic data;

a generation module, configured to determine, according to an obtained scene recognition result, at least one service currently suitable to or relevant to the target vehicle, and generate a service message of the at least one service; and a transmission module, configured to push the generated service message to the target vehicle.

In an exemplary implementation, the generation module is configured to determine the at least one service according to the obtained scene recognition result, each service of the at least one service having a different service type; and generate a service card matching the each service, one service card including a service message of one service.

In an exemplary implementation, the transmission module is configured to select service cards of at least two different service types from the generated service cards according to a priority rule, and push the selected service cards to the target vehicle; push a service card in highest demand in the current scene to the target vehicle; and push the generated service cards to the target vehicle successively at a target frequency interval according to the priority rule, the priority rule being that a service card in higher demand in the current scene has a higher priority.

In an exemplary implementation, the recognition module is configured to call a functional module in a public service layer to recognize the current scene of the target vehicle based on the obtained basic data.

In an exemplary implementation, the recognition module is configured to input the obtained basic data to a machine learning model of a model service module, and recognize the current scene of the target vehicle based on the machine learning model; detect, based on a rule configuration module, whether the obtained basic data satisfies a preset rule, and recognize the current scene of the target vehicle based on an obtained detection result; recognize the current scene of the target vehicle based on the obtained basic data and a portrait matching the basic data, the portrait being constructed based on historical basic data associated with the target vehicle; and call a content service module to obtain designated basic data matching a current time and space based on the obtained basic data and recognize the current scene of the target vehicle based on the designated basic data.

In an exemplary implementation, the recognition module is further configured to distribute the obtained basic data to different scene engines for scene recognition, basic data received by each scene engine matching a type of data to which the scene engine subscribes in advance; and use scenes recognized by the scene engines as the scene recognition result.

In an exemplary implementation, the recognition module is configured to verify the distributed basic data for each scene engine; and create a plurality of threads after the verification, and call, by using the plurality of threads, a functional module in a public service layer to recognize the current scene of the target vehicle based on the distributed basic data.

In an exemplary implementation, the generation module is configured to determine at least one scene having a service demand currently from the scenes recognized by the scene engines; determine a service matching the at least one scene according to a correspondence between scenes and services; and determine the service matching the at least one scene as the at least one service.

In an exemplary implementation, the recognition module is further configured to preprocess the obtained basic data; and distribute preprocessed basic data to different scene engines.

In an exemplary implementation, the transmission module is further configured to determine, according to a priority rule, a target service message from service messages generated by at least two scene engines, and push the target service message to the target vehicle, the target service message being a service message in highest demand in the current scene;

push, according to the priority rule, the service messages generated by the at least two scene engines to the target vehicle successively at a target frequency interval;

push, according to the priority rule, some service messages in the service messages generated by the at least two scene engines to the target vehicle successively at the target frequency interval; and push, in response to that one scene engine generates at least two service messages, the at least two service messages to the target vehicle at the target frequency interval, the priority rule being that a service message in higher demand in the current scene has a higher priority.

In an exemplary implementation, the obtaining module is further configured to obtain a message display template matching the generated service message.

The transmission module is further configured to transmit the message display template to the target vehicle, the message display template being used for instructing the target vehicle to display the received service message according to the message display template.

In an exemplary implementation, the vehicle and user data includes vehicle data and user data;

the vehicle data includes at least vehicle state data and track data; the user data includes at least user behavior data, user preference data, and resource label data of a vehicle-side user; and the driving environment data includes at least road condition data, weather environment data, point of interest (POI) data, and infrastructure data.

In an exemplary implementation, a portrait matching the basic data includes a user portrait, a vehicle portrait, an environment portrait, and a content portrait, the environment portrait being constructed according to historical weather environment data and updated by using weather environment data obtained in real time, the vehicle portrait being constructed according to historical vehicle state data and updated by using vehicle state data obtained in real time, the user portrait being constructed according to historical user behavior data and historical user preference data and updated by using user behavior data and user preference data obtained in real time, and the content portrait being constructed according to historical resource label data and updated by using resource label data obtained in real time.

According to another aspect, a non-transitory computer-readable storage medium is provided, the non-transitory storage medium storing at least one instruction, the instruction, when being loaded and executed by at least one processor, causing an electronic device to:

obtain basic data associated with a target vehicle, the basic data comprising at least vehicle and user data and driving environment data;

recognize a current scene of the target vehicle based on the basic data to obtain a scene recognition result;

determine, according to the scene recognition result, at least one recommended service for the target vehicle;

generate a service message of the at least one recommended service; and push the service message to the target vehicle.

According to another aspect, a server is provided, including at least one processor and a memory, the memory storing at least one instruction, the at least one processor being configured to execute the at least one instruction to cause the server to:

obtain basic data associated with a target vehicle, the basic data comprising at least vehicle and user data and driving environment data;

recognize a current scene of the target vehicle based on the basic data to obtain a scene recognition result;

determine, according to the scene recognition result, at least one recommended service for the target vehicle;

generate a service message of the at least one recommended service; and push the service message to the target vehicle.

The technical solutions provided in the embodiments of this disclosure have the following beneficial effects:

According to the embodiments of this disclosure, a server actively obtains basic data associated with a vehicle, and actively recognizes a current scene of a target vehicle based on the obtained basic data, the basic data including at least vehicle and user data and driving environment data. After determining at least one service currently suitable for or relevant to the target vehicle according to an obtained scene recognition result, the server automatically generates a service message of the at least one service, and actively pushes the generated service message to the vehicle. According to the embodiments of this disclosure, active scene recognition is implemented, possible services required by or relevant to a user in a current time and space can be actively determined based on a scene recognition result, and a corresponding service message is actively pushed to a vehicle side. The user may enjoy required or relevant services without additional operations, thereby greatly improving driving safety in a vehicular environment and satisfying service demands of the user in the vehicular environment, which has better effects.

BRIEF DESCRIPTION OF THE DRAWINGS

To describe technical solutions in embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

Figure 1:
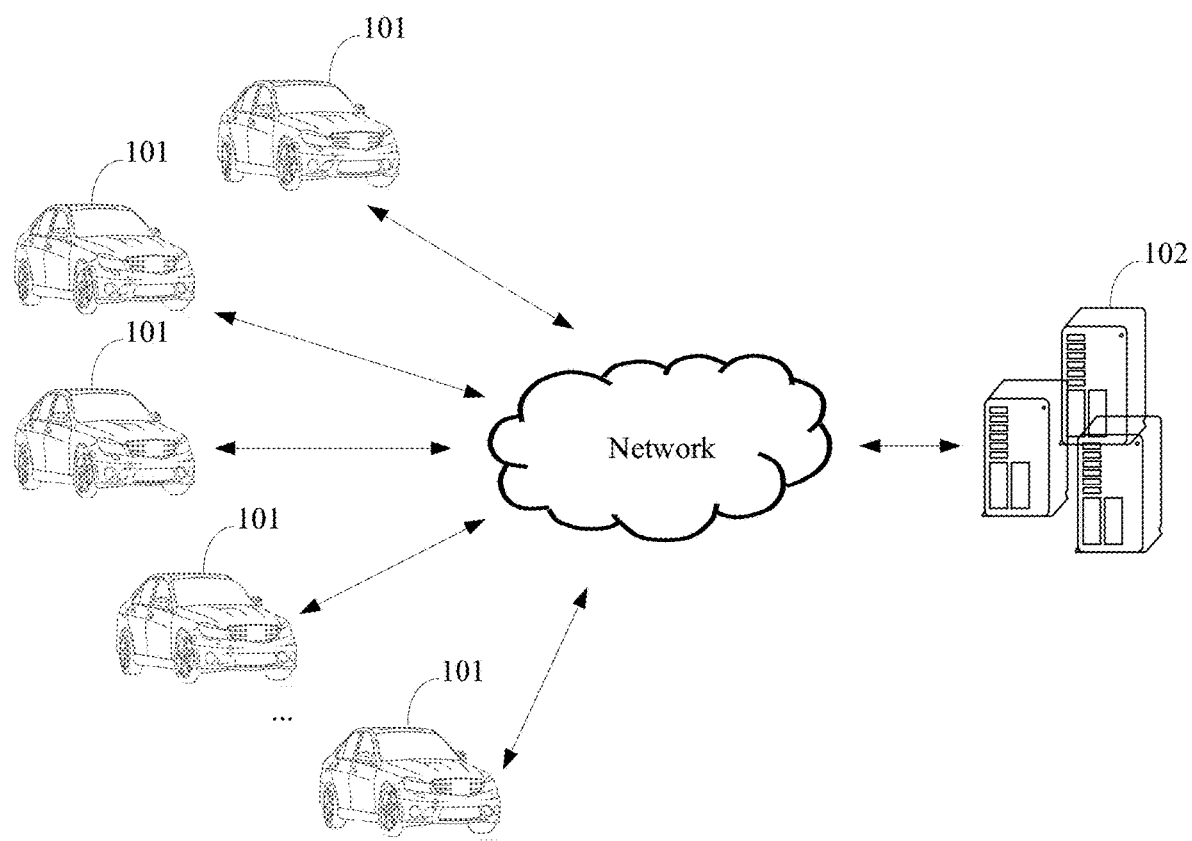
FIG. 1 is a schematic diagram of an implementation environment involved in a message pushing method according to an embodiment of this disclosure.

To make objectives, technical solutions, and advantages of this disclosure clearer, the following further describes implementations of this disclosure in detail with reference to the accompanying drawings.

It may be understood that the terms "first", "second", and the like used in this disclosure may be used for describing various concepts in this specification. However, the concepts are not limited by the terms unless otherwise specified. The terms are merely used for distinguishing one concept from another concept.

At least one refers to one or more. For example, at least one service card may be one service card, two service cards, three service cards, and any another integer number of service cards, where the integer number is greater than or equal to one.

At least two refers to two or more. For example, at least two service cards may be two service cards, three service cards, and any another integer number of service cards, where the integer number is greater than or equal to two.

A plurality of refers to two or more. For example, a plurality service cards may be two service cards, three service cards, and any another integer number of service cards, where the integer number is greater than or equal to two.

Before the embodiments of this disclosure are explained and described in detail, some terms involved in the embodiments of this disclosure are explained and described first.

Scene: In an IoV environment, a scene is used for describing, such as, a time, a space, an environment inside a vehicle, an environment outside the vehicle, a vehicle body state, and a current behavior of a user.

In an example, scenes such as "commuting, fatigue, suitable for washing the vehicle, or night highway" may be automatically recognized through real-time data acquisition in a vehicular environment, thereby actively pushing a service currently required or relevant to by the user to the user based on a scene recognition result.

Portrait: a tool for effectively depicting people or things. A portrait for describing a person or a thing is formed by abstracting specific information of the person or thing.

In an exemplary implementation, for an IoV scene, a portrait is not only used for the user, but also may be a tendentious and statistically significant result formed by mining historical data in a plurality of dimensions such as users, vehicles, environment (such as weather), and resource labels.

That is, a portrait may be constructed by mining historical data, and the constructed portrait may also be updated according to data acquired in real time. This is not specifically limited in the embodiments of this disclosure. In an example, the constructed portrait in the embodiments of this disclosure is usually used for performing early abstraction on historical data to learn features, and is quickly called in a subsequent scene recognition process to assist scene perception.

An implementation environment involved in a message pushing method provided in an embodiment of this disclosure is described below.

Referring to FIG. 1, the implementation environment includes vehicles 101 and a server 102. The server 102 is also referred to as an IoV platform or a backend server in this specification. The server 102 may communicate with the vehicles 101 by using a mobile network or a wireless network. This is not specifically limited in this embodiment of this disclosure.

In an exemplary implementation, a vehicle-mounted multimedia terminal on the vehicle 101 is installed with an adapted application software client, and the vehicle 101 communicates with the IoV platform by using the application software client. This is not specifically limited in this embodiment of this disclosure.

In the IoV scene, the related art can only provide a single scene recognition service currently, and the scene recognition can only be performed at the vehicle side, that is, scene perception is performed by using a corresponding application software client on the vehicle side. This seriously restricts the scene expandability, the service lacks variety, and the application software client affects an output of the service ability in a process of service upgrading. In addition, a user is required to be focused and consistent while driving, and therefore, the user may not be able to perform other operations to obtain other in-vehicle demands in a vehicular environment. Even if the user can perform other operations, the user needs to perform tedious operation steps to obtain the in-vehicle demands. For example, the user needs to manually perform a plurality of operations or initiate a voice instruction in the vehicular environment for awakening, resulting in problems of, such as, tedious operation steps, driving safety, and untimely information when the driving process is performed concurrently with other in-vehicle demands.

Considering the foregoing problems in the related art, according to this embodiment of this disclosure, the server 102 tightly combines, in an online service manner, understandings on user demands and understandings on scene and space with the vehicle based on acquired omni-directional data such as people, vehicles, road, and environment. The server 102 can accurately recognize various vehicle scenes in real time and actively push personalized services to the vehicle 101. For example, a personalized service in a message form is displayed by using a dynamic container technology of the application software client on the vehicle 101.

According to this embodiment of this disclosure, the service is provided in an online manner. Specifically, the server 102 performs the scene perception; in addition, the server 102 also can perform an active scene recognition and push a corresponding service based on data acquired in real time. In addition, with stronger scene expansibility, the server 102 not only can provide a plurality of scene perception services by using a plurality of scene engines, but also can enrich and enhance the existing engine capability or add new scene engines without affecting existing scene engines. Thereby, a perfect in-vehicle ecology can be created by providing combinational, multidimensional, precise, long-tail scene services. The long-tail scene service is derived from the long tail theory.

Figure 2:
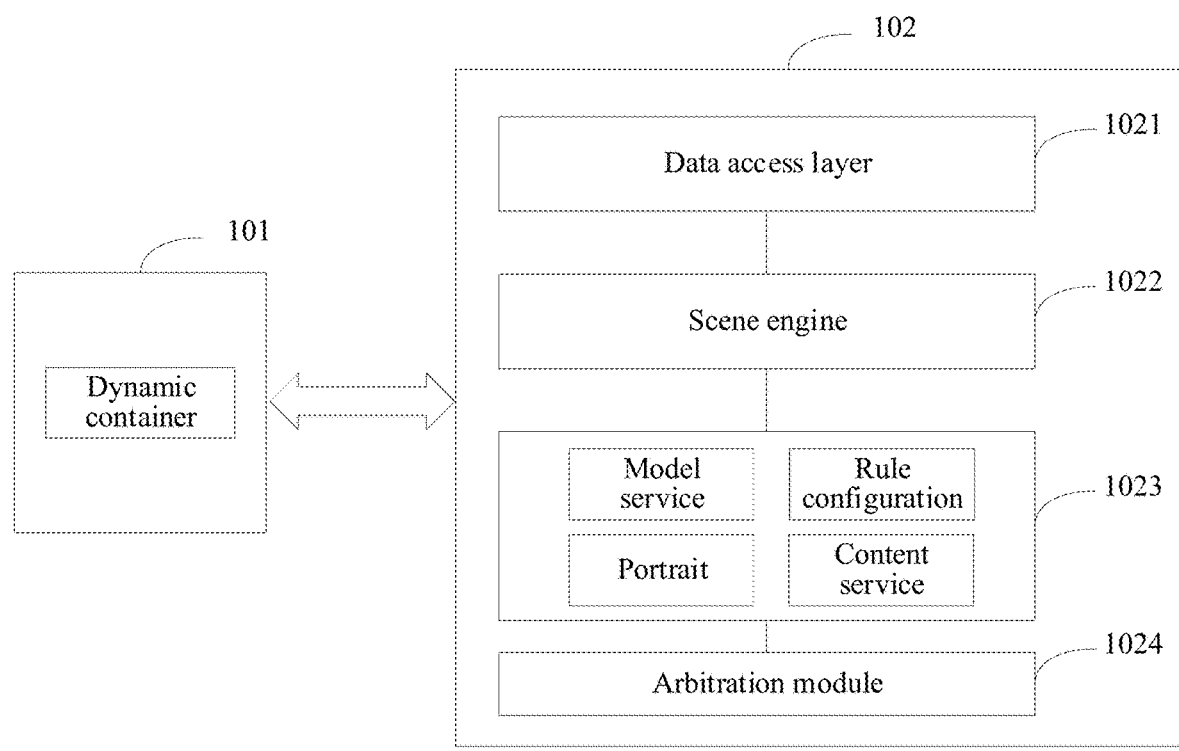
FIG. 2 is a schematic diagram of an interaction framework involved in a message pushing method according to an embodiment of this disclosure.

In other words, according to this embodiment of this disclosure, real-time scene recognition is performed based on acquired omni-directional data such as people, vehicles, road, and environment and with reference to the dynamic container technology of the application software client, an algorithm service of real-time data model analysis of the server 102, and the interaction framework technology shown in FIG. 2. Therefore, the server 102 has stronger scene expansibility, and enriches and enhances the existing engine capability or adds new scene engines without affecting existing scene engines. The interaction framework technology may be a spring-boot-TAF scene engine framework technology. This is not specifically limited in this embodiment of this disclosure. In addition, an online algorithm service empowers the engineering more conveniently, and self-upgrading of the algorithm service does not affect a capability output of the scene perception service. That is, a scene perception function provided by the server 102 is not interrupted by the self-upgrading of the algorithm service.

As shown in FIG. 2, the server 102 mainly includes the following:

A data access layer 1021: the data access layer is configured to shield the diversity of data sources at upper layers and uniformly preprocess data acquired through various channels. The preprocessing includes, but is not limited to, data verification and unified encapsulation on different data from a plurality of data sources. For example, data is encapsulated into a uniform data format or a uniform event message body. This is not specifically limited in this embodiment of this disclosure.

A scene engine 1022: the scene engine is a part configured to connect upstream and downstream hierarchies or modules.

In this embodiment of this disclosure, the scene engine 1022 part may include numerous scene engines. Different scene engines may perform different scene perceptions, and new scene engines may be added or expanded in the scene engine 1022 part continuously. That is, this embodiment of this disclosure provides various scene engine capabilities, and each scene engine may subscribe, according to analysis data characteristics of the scene engine, to data of interest from the data access layer 1021 for analysis. In other words, the data access layer 1021 may distribute, according to types of data to which the scene engines subscribe, the preprocessed data to different scene engines for analysis, so as to complete the scene perception. That is, the preprocessed data received by each scene engine matches the type of data to which the each scene engine subscribes in advance.

Public service layer 1023. The public service layer is an independent layer and used as a public algorithm, to provide basic service capabilities for all scene engines. That is, the scene engine 1022 completes the scene perception by using the public service layer 1023. As shown in FIG. 2, the public service layer 1023 includes a plurality of functional modules assisting in the scene recognition, for example, a rule configuration module, a model service module, a portrait, and a content service module. In an embodiment, the content service module refers to a weather service, a road condition service, or the like. This is not specifically limited in this embodiment of this disclosure.

The rule configuration module is configured to provide a lightweight preceding rule implementation, for example, determine whether a vehicle is exceeding the speed limit based on a preset threshold. The model service module is generally an artificial intelligence (AI) model, and is configured to perceive a complex scene, for example, predict a next route in a navigation scene. That is, the model service module is configured to perform model analysis on inputted basic data with reference to AI algorithms, and mainly to further dig the data based on historical features.

Arbitration module 1024. The arbitration module is configured to arbitrate a service message generated after the scene engine 1022 completes the scene recognition, for example, to perform priority control and flow control. For example, in a case that all service messages generated in a plurality of scenes need to be pushed to the vehicle 101, the arbitration module 1024 mainly performs delivery priority control on the plurality of service messages and delivery frequency control on service messages of a single type.

For example, according to this embodiment of this disclosure, a uniform extensible message structure is provided for the application software client on each vehicle based on a general message protocol, that is, a fixed message structure format is used to ensure that the application software client can recognize service messages pushed by the server 102 in any case. The application software client does not need to make any change, thereby ensuring high expandability of the scene recognition, and avoiding frequent upgrading that occurs when the application software client fails to resolve a newly-added service message type, so that the latest scene service can be dynamically provided with minimum cost.

In conclusion, according to this embodiment of this disclosure, possible services required by or relevant to the user at a current time or location can be actively determined by using real-time active scene recognition and the services may be actively pushed to the user, thereby greatly improving driving safety and user experience, enhancing the perception of long-tail services, and bringing richer driving experience to the user. In detail, based on the interaction framework, the IoV scene achieves at least the following advantages:

1. The scene recognition is implemented based on data analysis prediction of a server side. That is, according to this embodiment of this disclosure, the scene recognition is implemented by the server side, which can provide powerful scene perceptibility, that is, provide diversified services.

2. Powerful scene expandability: as the services become more abundant, the server side can provide more scene engines without changing the current architecture, that is, the interaction framework provided in this embodiment of this disclosure can rapidly expand the scene engines without affecting capability outputs of other scene engines.

3. Multi-tenancy fast adaptability: through configuration, the same service capability can cater for different vehicle scene requirements without version iteration. That is, this embodiment of this disclosure can adapt to vehicle scenes with different demands, and can cater for vehicle scenes with different demands.

4. Accurate recommendation based on real-time scene recognition: an accurate pushing service can be actively provided by performing scene perception in real time based on the scene engines.

A message pushing method provided in the embodiments of this disclosure is described below in detail.

The terms "first", "second", "third", "fourth", and the like described below are intended to distinguish between similar objects but do not constitute any other limitation.

Figure 3:
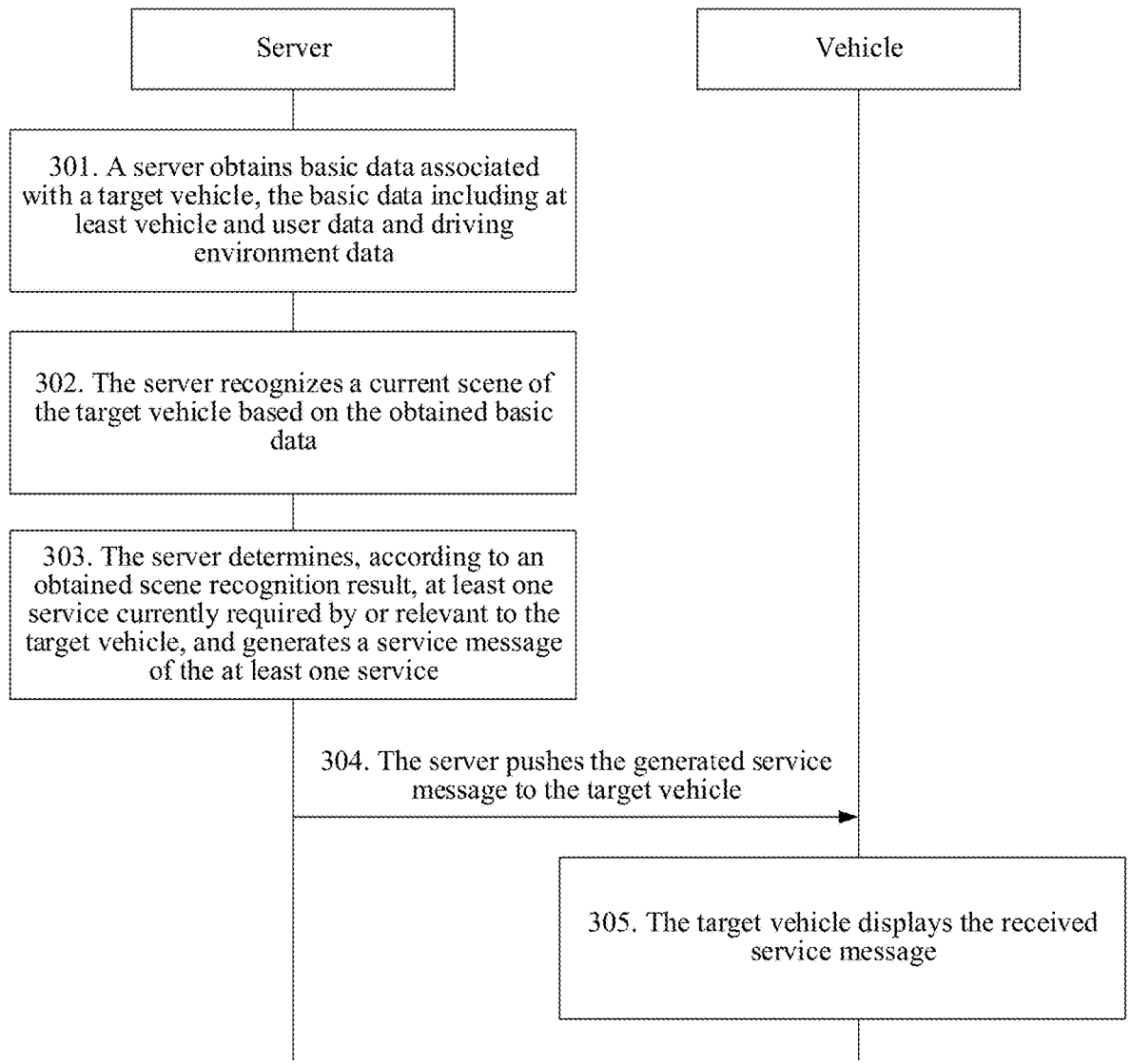
FIG. 3 is a flowchart of a message pushing method according to an embodiment of this disclosure.

FIG. 3 is a flowchart of a message pushing method according to an embodiment of this disclosure. Interaction bodies of the method are the vehicle and the server shown in FIG. 1. Referring to FIG. 3, a method process provided in this embodiment of this disclosure includes the following steps:

Step 301. A server obtains basic data associated with a target vehicle, the basic data including at least vehicle and user data and driving environment data.

The target vehicle in this specification refers to any vehicle connecting to the IoV.

This step is a data acquisition step, and according to this embodiment of this disclosure, a double-channel data acquisition mechanism of a vehicle side and a server side is established. That is, the server may acquire some data changes in real time by using a plurality of message touch points set at the vehicle side, that is, the server may acquire data from the vehicle. In turn, the server may also actively push some services to the vehicle after completing the scene perception. The services are usually pushed to the vehicle in the form of messages, and therefore, the services are referred to as service messages in this specification.

Figure 4:
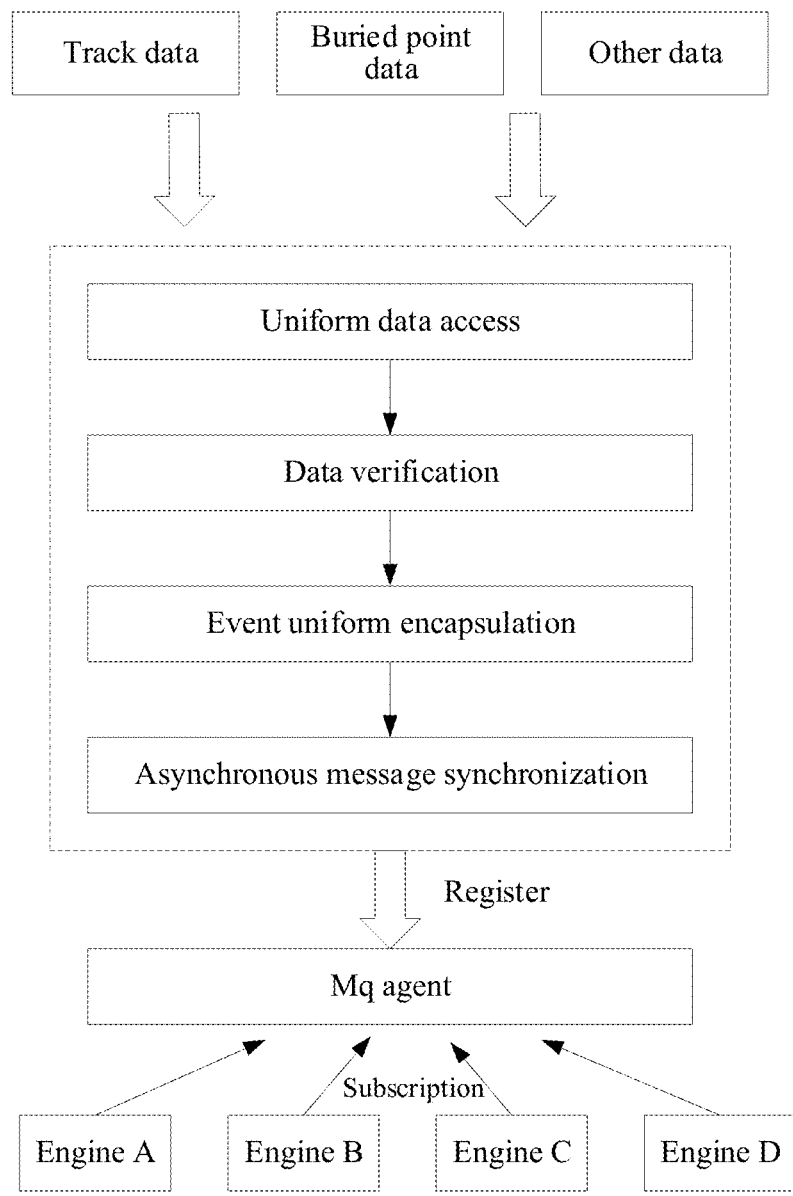
FIG. 4 is a schematic diagram of a data access layer according to an embodiment of this disclosure.

In this embodiment of this disclosure, the server may acquire data by using a plurality of channels. The acquired data may be coarsely divided into track data, buried point data, and other data as shown in FIG. 4. This is not specifically limited in this embodiment of this disclosure.

In an exemplary implementation, the server obtains the basic data associated with the target vehicle. The basic data includes, but is not limited to, at least two types of data: vehicle and user data and driving environment data.

Figure 5:
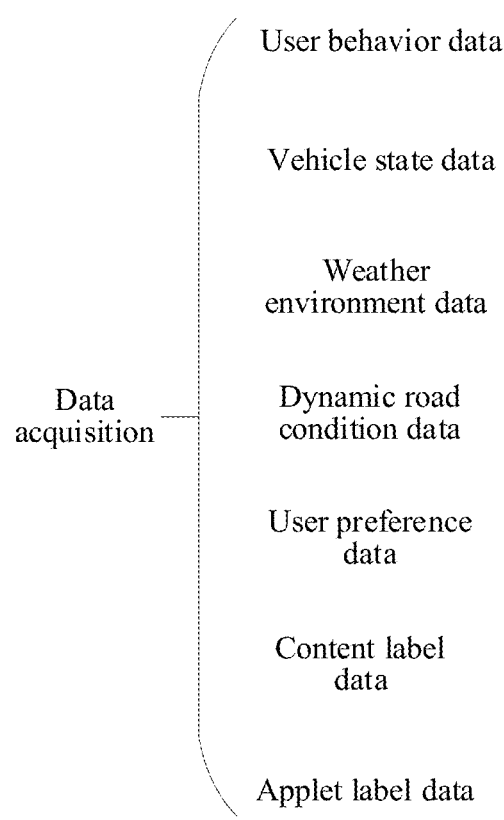
FIG. 5 is a schematic diagram of data acquisition according to an embodiment of this disclosure.

For example, as shown in FIG. 5, the server may obtain the following data:

First: user behavior data, vehicle state data, and other data that are strongly dependent on the vehicle side.

The user behavior data may include user behaviors such as opening an application, sliding to a next screen, and closing message notifications. For example, the foregoing application refers to an in-vehicle application. In an example, the vehicle state data may be classified into 15 categories: vehicle body states, driving data, energy/mode, panoramic cameras, air conditioners, air quality, gearboxs, door locks, wipers, car lights, safety belts, chargers, tires, instrument, and maintenance and repair. This is not specifically limited in this embodiment of this disclosure.

The data strongly dependent on the vehicle side may be provided to a portrait mining module and a scene engine of the server side by using a buried point report mode or a persistent connection real-time report mode.

Second: strong real-time data such as weather environment data and dynamic road condition data.

The weather environment data may include real-time air temperature, wind power, amount of precipitation, and the like based on a standard weather area. This is not specifically limited in this embodiment of this disclosure. The dynamic road condition data may include dynamic congestion conditions, passing time, traffic accidents, ponding points, electronic eyes, and the like based on a topological road. This is not specifically limited in this embodiment of this disclosure.

The real-time data is provided to the portrait mining module and the scene engine of the server side in a form of service.

Third: static data relying on external collaboration, such as user preference data and resource label data.

The user preference data is also referred to as user mobile terminal preference data in this specification, that is, preference data of the user on the mobile terminal is mainly acquired. The user mobile terminal preference data may include age, education background, music style preference, celebrity preference, news preference, consumption level, brand preference, and the like. This is not specifically limited in this embodiment of this disclosure.

The resource label data may be further divided into content label data and applet label data. The content label data usually refers to listening data, and may include song length, singer, style tag, album name, book author, and the like. The applet label data may include applet developer, service type, popularity, and the like. This is not specifically limited in this embodiment of this disclosure.

In an exemplary implementation, the static data may be jointly established at a portrait layer directly, that is, docked at the portrait layer and interacted at the portrait layer. For example, the static data related to the user may be directly obtained in other manners. This is not specifically limited in this embodiment of this disclosure.

Fourth: track data, POI data, and infrastructure data of the target vehicle may be further obtained.

The track data belongs to flow data and is obtained through a special approach. The POI data and the infrastructure data are obtained through services. The road condition data, the weather environment data, the POI data, and the infrastructure data are all driving environment data.

In a geographic information system, one POI may be a house, a store, a mailbox, a bus stop, or the like. The infrastructure may refer to a grass, a reservoir, or the like.

First, the user behavior data, the user preference data, and the resource label data are all related to the user, and therefore may be collectively referred to as user data of a target user in this specification. The target user is a user in the target vehicle. The vehicle state data and the track data may be collectively referred to as vehicle data of the target vehicle in this specification.

Secondly, in addition to being provided to the scene engine of the server side for real-time data analysis to complete the scene perception, the various acquired real-time basic data may be further provided to the portrait mining module of the server side to update constructed portraits in real time. This is not specifically limited in this embodiment of this disclosure.

In an exemplary implementation, data collection is accompanied with the construction of the portrait. A portrait may be constructed by mining the collected historical basic data (off-line data), and by mining the basic data collected in real time, the portrait can be updated. When the scene engine performs the real-time scene perception, the constructed portrait can further assist in the scene recognition.

Thirdly, in an exemplary implementation, because the static data usually has small changes, it is unnecessary to obtain the static data each time. For example, after being obtained once, the static data may not be obtained subsequently, or the static data is obtained at a relatively long interval. This is not specifically limited in this embodiment of this disclosure.

Figure 6:
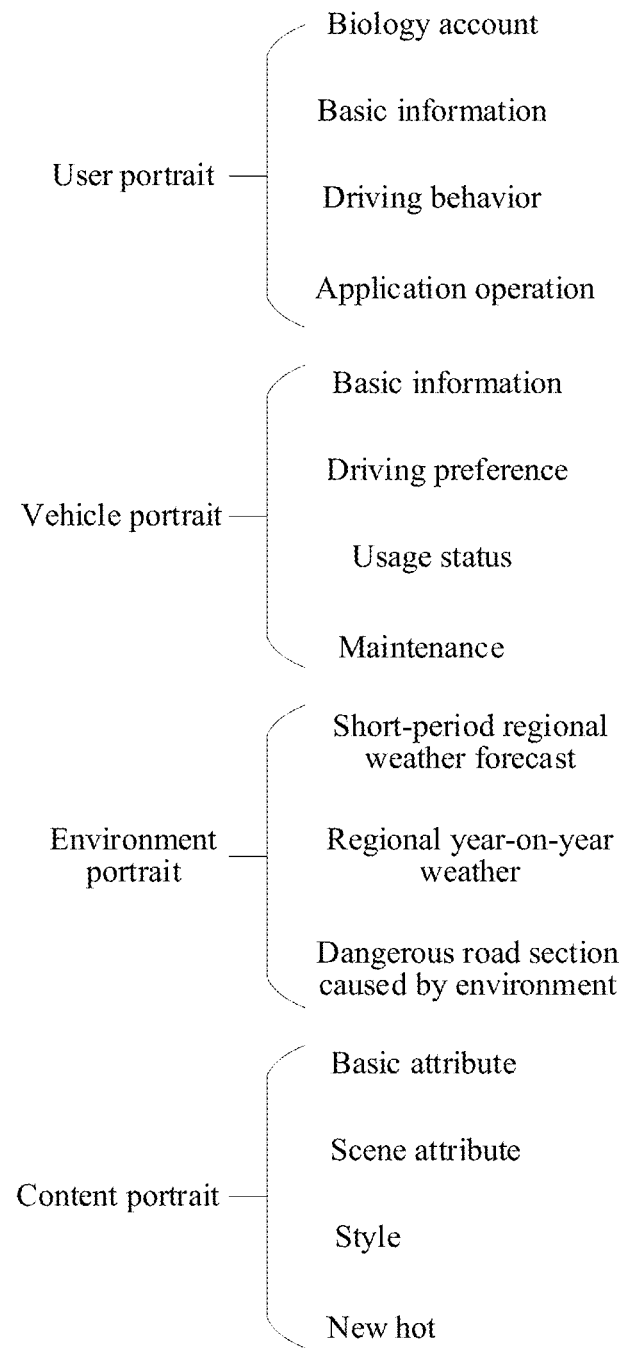
FIG. 6 is a schematic diagram of a portrait according to an embodiment of this disclosure.

The portrait mining is described below. As shown in FIG. 6, in an exemplary implementation, according to this embodiment of this disclosure, a portrait label library may be established according to four dimensions of user, vehicle, environment (especially weather), and content. That is, the established portrait includes a user portrait, a vehicle portrait, an environment portrait, and a content portrait.

In an example, referring to FIG. 6, the user portrait may be divided into four categories of biology account, basic information, driving behavior, and application operation.

The biology account includes, but is not limited to, user account information for the user to log in to various applications. The basic information includes, but is not limited to, age, occupation, education background, gender, location, and the like. The application operation includes, but is not limited to, various operations performed by the user on interfaces provided by an application. This is not specifically limited in this embodiment of this disclosure.

Vehicle portrait: For example, based on the 15 data acquisition categories of the vehicle state data, four categories of portraits including basic information, driving preference, usage status, and maintenance can be obtained. The basic information herein refers to basic information of the vehicle, and includes, but is not limited to, vehicle body states, tires, and door locks.

Environment portrait: For example, according to a real-time weather data query result, three categories of environment portraits including short-period regional weather forecast, regional year-on-year weather, and dangerous road sections caused by historical environmental changes can be obtained.

For example, the content portrait may be divided into four categories of basic attributes, scene attributes, styles, and new hots. The basic attribute includes, but is not limited to, singer, song length, album name, book author, and the like. The style may refer to a style of a song. The new hot may refer to popularity of an applet, popularity of a song, popularity of a book, or the like. The scene attribute may refer to a suitable scene for the song. This is not specifically limited in this embodiment of this disclosure.

Fourthly, not all the basic data in the obtained basic data is used for portrait mining, for example, the basic data provided in a form of a service is not used for portrait.

In addition, according to this embodiment of this disclosure, the portrait mined from the vehicular environment may be further fused with a same-label portrait of the user at the mobile terminal. For example, the content portrait in the vehicular environment is fused with a content portrait of the user at the mobile terminal to describe the user more completely. For example, it is learned that the user prefers heavy metal music in the vehicular environment and prefers soft music in the mobile terminal scene, so that different services are provided to the user in different scenes.

In an exemplary implementation, based on the foregoing description, the environment portrait may be constructed according to historical weather environment data and updated by using weather environment data obtained in real time. The vehicle portrait may be constructed according to historical vehicle state data and updated by using vehicle state data obtained in real time. The user portrait may be constructed according to historical user behavior data and historical user preference data and updated by using user behavior data and user preference data obtained in real time. The content portrait may be constructed according to historical resource label data and updated by using resource label data obtained in real time. This is not specifically limited in this embodiment of this disclosure.

Step 302. The server recognizes a current scene of the target vehicle based on the obtained basic data.

In an exemplary implementation, as shown in FIG. 2, the scene engine in the server calls a functional module in the public service layer to recognize the current scene of the target vehicle.

Step 303. The server determines, according to an obtained scene recognition result, at least one service currently suitable for or relevant to the target vehicle, and generates a service message of the at least one service.

In an exemplary implementation, the service provided in this embodiment of this disclosure includes, but is not limited to, a basic service and a value-added service. The basic service includes, but is not limited to, a navigation service. The value-added service may be also referred to as a content service or a care service, and includes, but is not limited to, a weather service, a listening service, and the like. This is not specifically limited in this embodiment of this disclosure.

Figure 7:
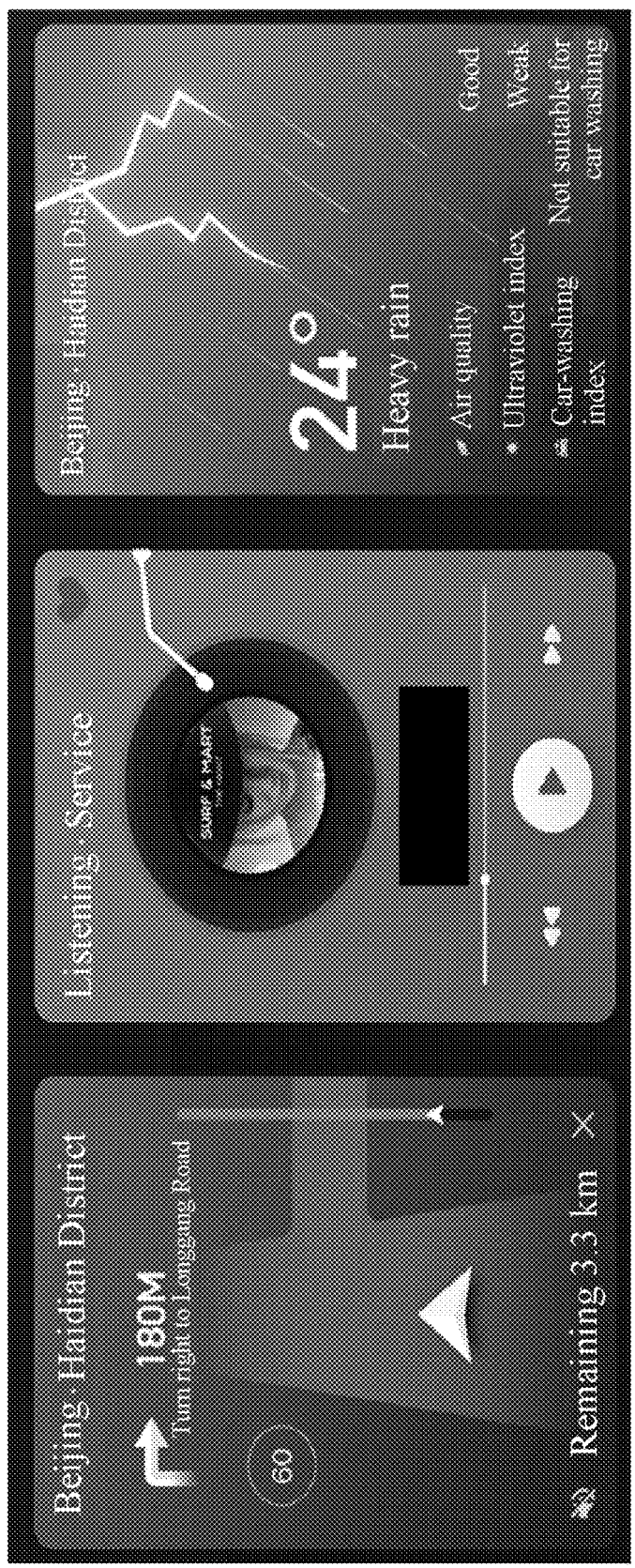
FIG. 7 is a schematic diagram of a display of a service card at a vehicle side according to an embodiment of this disclosure.

In an exemplary implementation, as shown in FIG. 7, a generated service message is pushed in a form of a service card according to this embodiment of this disclosure. The service card may be generated at the server side, and then the server pushes the generated service card to the vehicle side for display. Alternatively, the vehicle side may generate the service card after receiving the service message pushed by the server. This is not specifically limited in this embodiment of this disclosure.

In an example, determining, according to an obtained scene recognition result, at least one service currently suitable for or relevant to the target vehicle, and generating a service message of the at least one service includes: determining, according to the obtained scene recognition result, the at least one service currently suitable for or relevant to the target vehicle, and generating a service card matching each service according to a service type. One service card includes a service message of one service. In other words, the server may generate a service card matching each service.

In an example, each service of the at least one service usually has a different service type. For example, if the at least one service includes a weather service, a listening service, and a navigation service, a weather card corresponding to the weather service, a listening card corresponding to the listening service, and a navigation card corresponding to the navigation service may be generated. That is, service cards of three different service types are generated.

Step 304. The server pushes the generated service message to the target vehicle.

In an example, the server pushes messages to the vehicle side by using a uniform extensible message structure. That is, a fixed message structure format is used to ensure that the application software client at the vehicle side can recognize pushed service messages in any case. The application software client does not need to make any change. Even if there is a newly expanded scene service, the application software client can still resolve newly-added service message type and therefore the application software client is not updated frequently, so that a latest scene service can be dynamically provided with minimum cost.

In an exemplary implementation, that the server pushes the generated service message to the target vehicle includes, but is not limited to, any one of the following:

A. The server selects service cards of at least two different service types from the generated service cards according to a priority rule, and push the selected service cards to the target vehicle.

For this step, usually different scenes correspond to different service demands, but the user may need a plurality of services at the same time in one scene. Therefore, a plurality of service cards for different service types may be pushed to the vehicle-side user, thereby implementing diversified services. In addition, if excessive service cards are generated, to avoid frequent disturbance to the user and considering a display screen size of a vehicle terminal, several different service types of service cards may be selected from the generated service cards to be pushed to the vehicle-side user according to a priority rule. However, if the quantity of the service cards is lower than a specified threshold, all the generated service cards may be pushed to the vehicle-side user at one time to serve the vehicle-side user diversely. This is not specifically limited in this embodiment of this disclosure.

For example, the priority rule may indicate that a service card in higher demand in the current scene has a higher priority. In an example, a degree of demand may be set in advance. This is not specifically limited in this embodiment of this disclosure.

In an example of a scene of overcast+fatigue+expressway, according to the current scene of the vehicle-side user, the server may determine that the vehicle-side user currently needs a weather service, a listening service, and a navigation service. To help the user obtain diversified services, the server may push service cards of three different service types to the vehicle-side user, including a weather card outputting a weather message, a listening card outputting a listening message, and a navigation card outputting a navigation message. Further, the vehicle side may output the three service cards at the same time for the vehicle-side user to browse.

B. The server pushes a service card in highest demand in the current scene to the target vehicle.

In addition to a manner of pushing a plurality of service cards, a service card in highest demand may be alternatively pushed to the vehicle-side user. This is not specifically limited to this embodiment of this disclosure. For example, assuming that the user is in a fatigue scene currently, the most required or relevant service of the vehicle side currently may be an audio listening service, not the weather service. Therefore, the listening card is selected to be pushed to the vehicle-side user in the current scene.

C. The server pushes the generated service cards to the target vehicle successively at a target frequency interval according to the priority rule.

In another example, to ensure that the vehicle-side user can obtain diversified services and to avoid frequent disturbance to the vehicle-side user, the service cards may be alternatively pushed to the vehicle-side user successively according to preset priorities. This is not specifically limited in this embodiment of this disclosure.

Step 305. The target vehicle displays the received service message.

In an example, as shown in FIG. 7, the service message may be presented to the vehicle-side user in a form of a service card. This is not specifically limited to this embodiment of this disclosure.

In an example, the service card at the vehicle side may have the following function features:

The service card may be presented by using the application software client of the vehicle side. In addition, content of the service card may be replaced, for example, replacement of partial elements or all elements is supported. The element may be a button including a hyperlink. In addition, the service card has a characteristic of fading, that is, the service card has a special animation effect of fading when being removed, and when one service card fades, the remaining subsequent service cards are usually moved forward one place by default. In addition, the service cards may be sorted dynamically. For example, adjustment of a sequence of the service cards is supported, and a corresponding special animation effect is provided. In addition, the service cards can be removed manually; for example, the service card (usually the weather service card is a bottom card and cannot be removed) may be removed by using a gesture operation (such as sliding upward). In addition, a service card can be added manually. In addition, sliding is supported inside the service card; for example, a waterfall flow may be viewed through sliding. In addition, a size of the service card is adapted to the screen size. In addition, a plurality of interface elements can be presented inside the service card; that is, the service card may present rich interface elements and has special animation effects with good vision experience.

According to the method provided in this embodiment of this disclosure, a server actively obtains basic data associated with a vehicle, and actively recognizes a current scene of a target vehicle based on the obtained basic data, the basic data including at least vehicle and user data and driving environment data. After determining at least one service currently suitable for or relevant to the target vehicle according to an obtained scene recognition result, the server automatically generates a service message of the at least one service, and actively pushes the generated service message to the vehicle. According to the embodiments of this disclosure, active scene recognition is implemented, possible services suitable for or relevant to a user in a current time and space can be actively determined based on a scene recognition result, and a corresponding service message is actively pushed to a vehicle side. The user may enjoy required or relevant services without additional operations, thereby greatly improving driving safety in a vehicular environment and satisfying service demands of the user in the vehicular environment.

Figure 8:
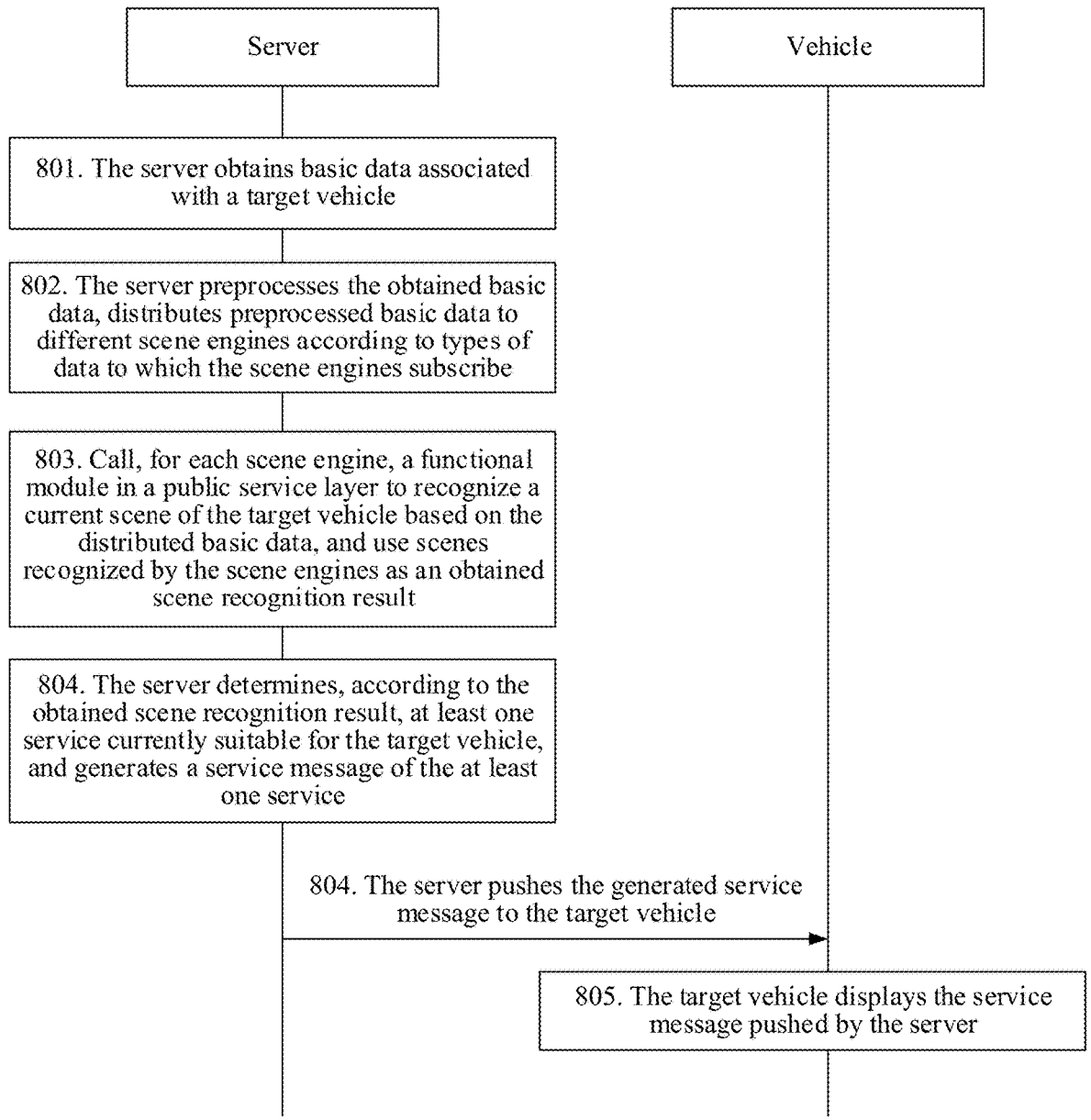
FIG. 8 is a flowchart of a message pushing method according to an embodiment of this disclosure.

FIG. 8 is a flowchart of a message pushing method according to an embodiment of this disclosure. Interaction entities of the method are the vehicle and the server shown in FIG. 1. Referring to FIG. 8, a method process provided in this embodiment of this disclosure includes the following steps:

Step 801. A server obtains basic data associated with a target vehicle.

This step is the same as step 301.

Step 802. The server preprocesses the obtained basic data and distributes preprocessed basic data to different scene engines according to types of data to which the scene engines subscribe.

This step is to distribute preprocessed basic data to different scene engines of the server, basic data received by each scene engine matching a type of data to which the scene engine subscribes in advance.

In this embodiment of this disclosure, the preprocessing of data is completed by a data access layer. A process of preprocessing may be as shown in FIG. 4, after performing uniform data access on basic data from a plurality of data sources, the data access layer first performs data verification on the obtained basic data.

After the data verification, to shield the diversity of data sources, event uniform encapsulation is performed, and the data is encapsulated into a uniform event message body. That is, the event uniform encapsulation step is responsible for performing data encapsulation on the verified basic data to obtain basic data having a uniform data format.

In an exemplary implementation, all data exchanges involved in this embodiment of this disclosure are asynchronous, that is, all the data is exchanged in the form of asynchronous messages. Therefore, before registering with a registration center, the asynchronous messages may be synchronized first. This is not limited in this embodiment of this disclosure.

In an example, the registration center may be an Mq (producer/consumer model) agent. As shown in FIG. 4, as a data provider, the data access layer registers with the Mq agent, and as a subscriber. Each scene engine may subscribe to data of interest from the data access layer by using the Mq agent for analysis.

The scene engines A to D shown in FIG. 4 do not limit the quantity of scene engines, and actually, more scene engines may be included.

Step 803. Call, for each scene engine, a functional module in a public service layer to recognize a current scene of the target vehicle based on the distributed basic data, and use scenes recognized by the scene engines as an obtained scene recognition result.

Figure 9:
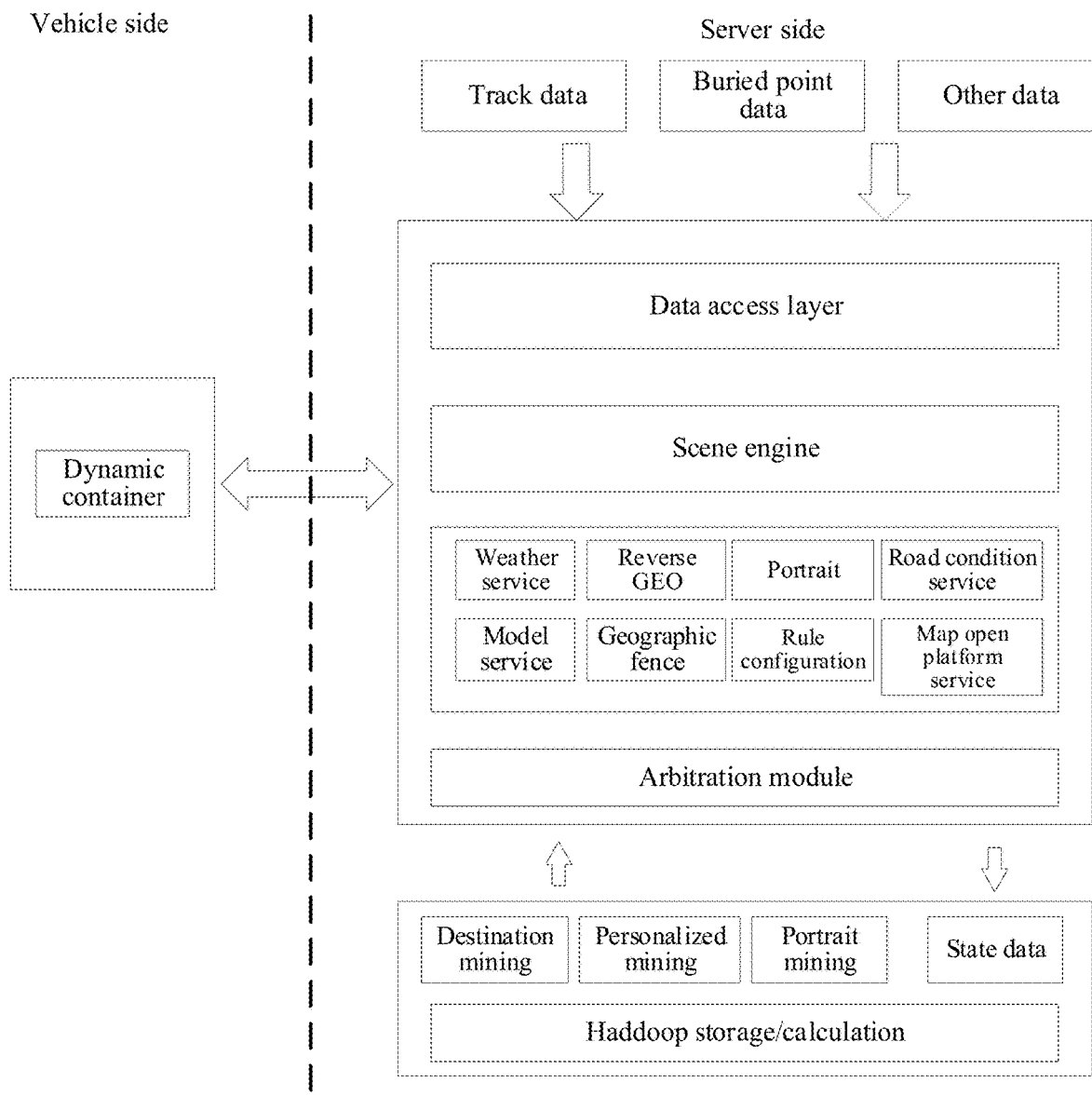
FIG. 9 is a schematic diagram of an interaction framework involved in a message pushing method according to an embodiment of this disclosure.

In an exemplary implementation, referring to FIG. 9, the functional module in the public service layer includes, but is not limited to, a model service module, a portrait, a rule configuration module, and a content service module.

In an example, calling a functional module in a public service layer to recognize a current scene of the target vehicle based on the distributed basic data includes at least one of the following:

Step 8031. Input the distributed basic data to a machine learning model of a model service module to recognize the current scene of the vehicle-side user based on the machine learning model.

For this step, the model service module is configured to recognize complex scenes, that is, recognize complex scenes based on an AI algorithm involved in the machine learning model. In other words, the model service module is configured to perceive a complex scene, for example, to predict a next route in a navigation scene. That is, the model service module is configured to analyze the inputted basic data with reference to AI algorithms, and mainly to further dig the data based on historical features.

Step 8032. Detect, based on a rule configuration module, whether the distributed basic data satisfies a preset rule and recognize the current scene of the vehicle-side user based on an obtained detection result.

For this step, the rule configuration module is configured to recognize a simple scene, that is, the rule configuration module is configured to provide a lightweight preceding rule implementation. For example, assuming that basic data distributed to a scene engine is vehicle state data, the scene engine may call the rule configuration module to determine whether a current driving speed of the vehicle exceeds a speed limit. That is, the rule configuration module may preset a speed threshold, meaning that, a preset rule is generated in advance. Then, whether the vehicle is speeding is determined based on the preset rule.

Step 8033. Recognize, based on the distributed basic data and a portrait matching the basic data, the current scene of the vehicle-side user.

In this embodiment of this disclosure, the generated portrait includes, but is not limited to, a user portrait, a vehicle portrait, an environment portrait, and a content portrait. The portrait is obtained by performing early abstraction on historical basic data associated with a vehicle and by learning features, and therefore, recognition accuracy can be greatly improved when scene recognition is performed based on acquired real-time basic data in combination with the portrait.

In another exemplary implementation, the generated portrait may be further configured to guide the scene engine to generate a service message. For example, a service message preferred by the user or a service message adapted to the basic information of the user is generated with reference to the user portrait and the content portrait. In another example, service messages adapted to user driving behaviors and habits and the like are generated with reference to the vehicle portrait. This is not specifically limited to this embodiment of this disclosure.

Step 8034. Call a content service module to obtain designated basic data matching a current time and space based on the distributed basic data and recognize the current scene of the vehicle-side user based on the designated basic data.

The content service module includes, but is not limited to, a weather service, a road condition service, a map open platform service, a geographic fence, a reverse geography (GEO), and the like shown in FIG. 9.

Using a weather service as an example, assuming that the basic data received by the weather service is track data and weather environment data, the weather service may determine a geographic location of the target vehicle based on the track data; the weather service determines weather environment data that match a current time and space based on the geographic location, the current time, and the distributed weather environment data. For example, the weather service obtains weather environment data such as air temperature and wind power at the current time and space, and then the weather service recognizes whether it is sunny or rainy currently based on the weather environment data matching the current time and space.

The geographic fence is used for determining whether a point is located on a surface, for example, for determining whether the vehicle is currently located in a geographic range of the home. If the vehicle is located in the geographic range of the home, a corresponding operation is performed; for example, an air conditioner or a light in the home is turned on in advance. The reverse GEO can output a geographic location in a context form based on longitude and latitude data; for example, geographic location information such as xx street xx district xx city is provided.

Figure 10:
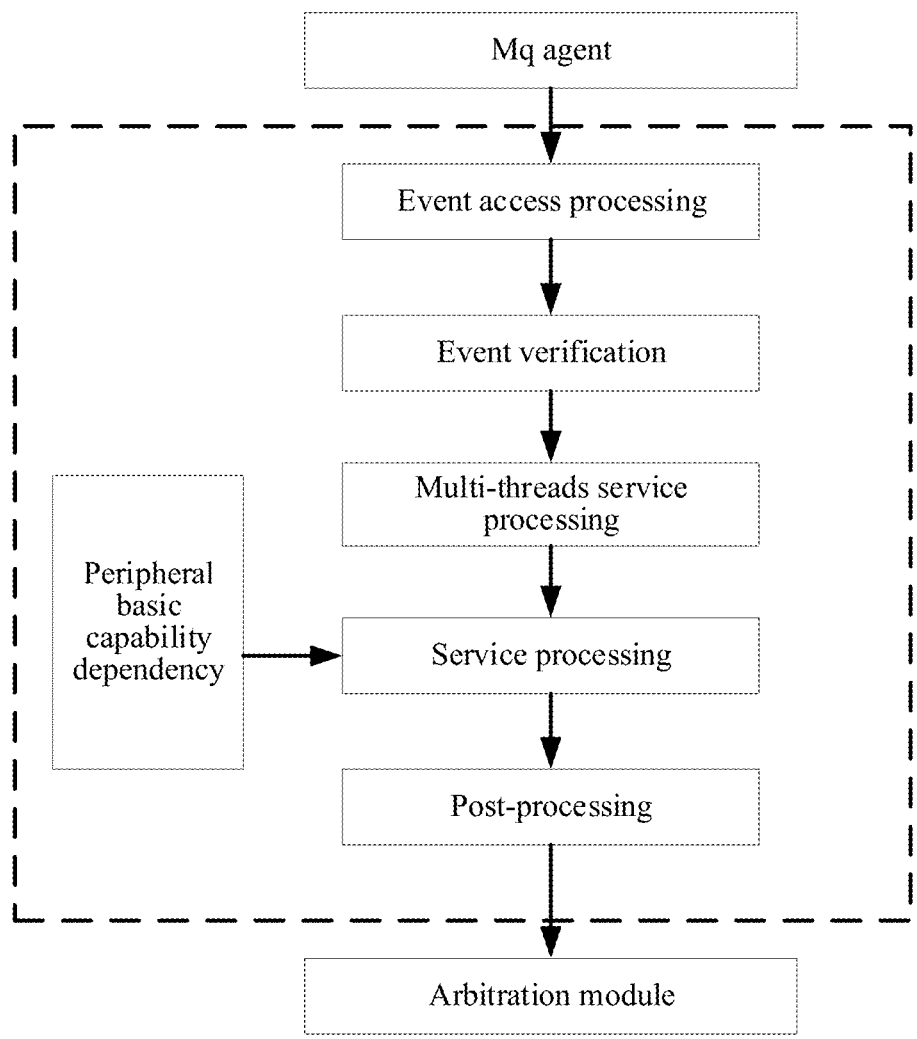
FIG. 10 is a schematic diagram of a scene engine according to an embodiment of this disclosure.

With reference to FIG. 10, service processing of a single scene engine is described.

As shown in FIG. 10, the obtained basic data is uniformly encapsulated at the data access layer, and therefore, the scene engine actually receives basic data in an "Event" format. The scene engine performs event verification. That is, after accessing the basic data in the Event format, each scene engine first performs event verification, that is, verifies the distributed basic data. After the verification is completed, in order to improve data processing efficiency, a plurality of threads are usually created for multi-thread service processing. For the service processing of each thread, referring to FIG. 10, the scene recognition is completed based on a peripheral basic capability. That is, a functional module in a public service layer is called to recognize a current scene of the target vehicle based on the distributed basic data. The post-processing in FIG. 10 refers to asynchronous processing performed on the generated service messages in the thread pool.

In another possible implementation, as shown in FIG. 9, algorithm prediction such as destination mining and personalized mining may be further performed based on historical basic data stored off-line to guide the scene recognition. This is not specifically limited in this embodiment of this disclosure. In addition, referring to FIG. 9, this embodiment of this disclosure further relates to storage of state data. The state data refers to some descriptive information about people, vehicles, and roads, environment, and the like, which is not generated frequently or changed frequently. In an example, a storage system may be a Hadoop storage system. This is not specifically limited in this embodiment of this disclosure.

Step 804. The server determines, according to the obtained scene recognition result, at least one service currently suitable for or relevant to the target vehicle, generates a service message of the at least one service, and pushes the generated service message to the target vehicle.

Each service of the at least one service has a different service type.

In an exemplary implementation, determining, according to the obtained scene recognition result, at least one service currently suitable for or relevant to the target vehicle includes the following steps: determining at least one scene having a service demand currently from the scenes recognized by the scene engines; determining a service matching the at least one scene according to a correspondence between scenes and services; and determining the service matching the at least one scene as the at least one service currently suitable for or relevant to the target vehicle.

Scenes with service demands refer to unconventional scenes where services are necessary. The scenes may be set in advance. For example, a rainy day scene, a fatigue scene, a speeding scene, and the like are all scenes where service demands exist. In addition, according to this embodiment of this disclosure, a correspondence between scenes and services may be further set. Different scenes may correspond to services of the same type. For example, a commuting scene and a fatigue scene may both correspond to a listening service. This is not specifically limited in this embodiment of this disclosure.

Example one: For a navigation scene, the basic data distributed by the data access layer to a corresponding scene engine may include any one or a combination of at least two of the following: vehicle state data, track data, dynamic road condition data, POI data, infrastructure data, and weather environment data. The corresponding scene engine calls a functional module in a public service layer, such as, a rule configuration module, a model service module, and a portrait, to perform scene recognition based on the foregoing distributed basic data and generate a navigation message matching the navigation scene, where the navigation message may be as shown in FIG. 7.

Example two: For a content service scene, the data distributed by the data access layer to a corresponding scene engine may include any one or a combination of two of the following: user behavior data and vehicle state data. The corresponding scene engine calls a functional module in a public service layer, such as, a content service module and a portrait, to perform scene recognition based on the foregoing distributed basic data and generate a content service message matching the content service scene to, for example, push a listening service to the vehicle-side user.

In this embodiment of this disclosure, pushing the generated service message to the target vehicle is completed by an arbitration module.

In an exemplary implementation, the arbitration module may include a flow control module, a decoration module, a pushing module, and the like. After the arbitration module receives the service message generated by the scene engine, the flow control module controls a distribution sequence or frequency of the service messages to avoid the interference caused by excessively frequent message pushing to the vehicle-side user. The decoration module is configured to control a display style of the service message on the application software client at the vehicle side. The pushing module is configured to push messages to the vehicle side.

Step 8041. The flow control module may control message pushing by using a priority rule when all service messages generated by a plurality of scene engines need to be pushed to the vehicle side.

Specifically, the flow control module may determine, according to the priority rule, a target service message from service messages generated by at least two scene engines, the target service message being a service message in highest demand in the current scene. In addition, the pushing module pushes the target service message to the vehicle side. The priority rule may indicate that a service message in higher demand in the current scene has a higher priority.

For example, assuming that the user is in a fatigue scene currently, the most required or relevant service of the vehicle side currently may be an audio listening service, not the weather service. In an example, a degree of demand may be set in advance. This is not specifically limited in this embodiment of this disclosure. In addition, to ensure diversified services, the flow control module may further select, according to the priority rule, service messages with highest degrees of demand from the service messages generated by the at least two scene engines for pushing. This is not specifically limited in this embodiment of this disclosure.

Secondly, the arbitration module may push messages to the vehicle side successively according to a set priority rule, or may stop pushing other service messages after pushing the service message most suitable for or relevant to the vehicle side currently, or may stop pushing messages after pushing several additional service messages. This is not specifically limited in this embodiment of this disclosure. That is, the method provided in this embodiment of this disclosure further includes the following steps:

Step 8042. Push, according to the priority rule, the service messages generated by the at least two scene engines to the target vehicle successively at a target frequency interval.

Step 8043. Push, according to the priority rule, some service messages in the service messages generated by the at least two scene engines to the target vehicle successively at the target frequency interval.

Step 8044. The flow control module may control, in a case that a single scene engine generates at least two service messages, distribution frequency of the service messages.

That is, when one scene engine generates at least two service messages, the data traffic control module may push the service messages to the vehicle side at a target frequency interval.

A value of the target frequency interval may be 5 minutes, 10 minutes, or the like. This is not specifically limited in this embodiment of this disclosure.

In an exemplary implementation, after the flow control on the service messages is completed, the arbitration module returns a flow control result to a caller. The caller herein refers to the scene engine. In addition, for a service message succeeded in the flow control, if the arbitration module determines that the service message satisfies the basic requirements, a return result indicating success may be further provided to the caller.

If the foregoing service message is in a service card format, a service card is pushed to the vehicle side.

Step 805. The target vehicle displays the service message pushed by the server.

In an exemplary implementation, the vehicle side may display the service message based on a dynamic message container technology.

In another possible implementation, the arbitration module may further indicate a display style of the service message at the vehicle side. Specifically, the decoration module in the arbitration module is configured to control a display style of the service message on the application software client of the vehicle side. The arbitration module may indicate a specific display style of the service message at the vehicle side by distributing a message display template. This is not specifically limited in this embodiment of this disclosure.

That is, the method provided in this embodiment of this disclosure further includes: obtaining a message display template matching the generated service message; and transmitting the message display template to the target vehicle, the message display template being used for instructing the target vehicle to display the received service message in a form of a service card according to the message display template.

First, one type of service message may correspond to one message display template. For example, a listening service corresponds to a message display template of one form, and a weather service corresponds to a message display template of another form. This is not specifically limited in this embodiment of this disclosure.

Secondly, the message display template may be transmitted before the service message is transmitted, or may be transmitted together with the service message. This is not specifically limited in this embodiment of this disclosure.

In conclusion, according to this embodiment of this disclosure, after a user gets into a vehicle, by analyzing data acquired in real time, the server side can actively recognize a current scene of the vehicle and actively push a corresponding service to the vehicle side when the vehicle-side user needs a service. For example, the server may push a service most suitable for or relevant to the user currently to the vehicle side, that is, the server may present a function card most required or relevant currently to the user, which enables the user to enjoy the service and obtain information more quickly and conveniently while immersing in driving.

The method provided by this embodiment of this disclosure at least has the following beneficial effects:

According to this embodiment of this disclosure, basic data associated with a vehicle is actively obtained, and after the obtained basic data is preprocessed by a data access layer, the data access layer may distribute, according to types of data to which scene engines subscribe, the basic data to different scene engines for scene recognition. After at least one service currently suitable for or relevant to a target vehicle is determined according to scenes recognized by the scene engines, a service message of the at least one service is automatically generated, and the generated service message is actively pushed to the vehicle according to this embodiment of this disclosure. According to the embodiments of this disclosure, active scene recognition is implemented, possible services suitable for or relevant to a user in a current time and space can be actively determined based on a scene recognition result, and a corresponding service message is actively pushed to a vehicle side. The user may enjoy required or relevant services without additional operations, thereby greatly improving driving safety in a vehicular environment and satisfying service demands of the user in the vehicular environment, which has better effects. That is, according to this embodiment of this disclosure, scene perception is performed by using scene engines, thereby actively providing an accurate pushing service for the vehicle-side user.

In addition, according to this embodiment of this disclosure, the scene recognition is completed by the server side, thus not only providing powerful scene perceptibility, that is, diversified services, but also providing powerful scene expandability. Specifically, as the services become more abundant, the server side can provide more scene engines without changing the current architecture, that is, the interaction framework provided in this embodiment of this disclosure can rapidly expand the scene engines without affecting capability outputs of other scene engines.

In addition, according to this embodiment of this disclosure, fast adaptability of multi-tenancy is provided: through configuration, the same service capability can cater for different vehicle scene requirements without version iteration. That is, this embodiment of this disclosure can adapt to vehicle scenes with different demands, and can cater for vehicle scenes with different demands.

Figure 11:
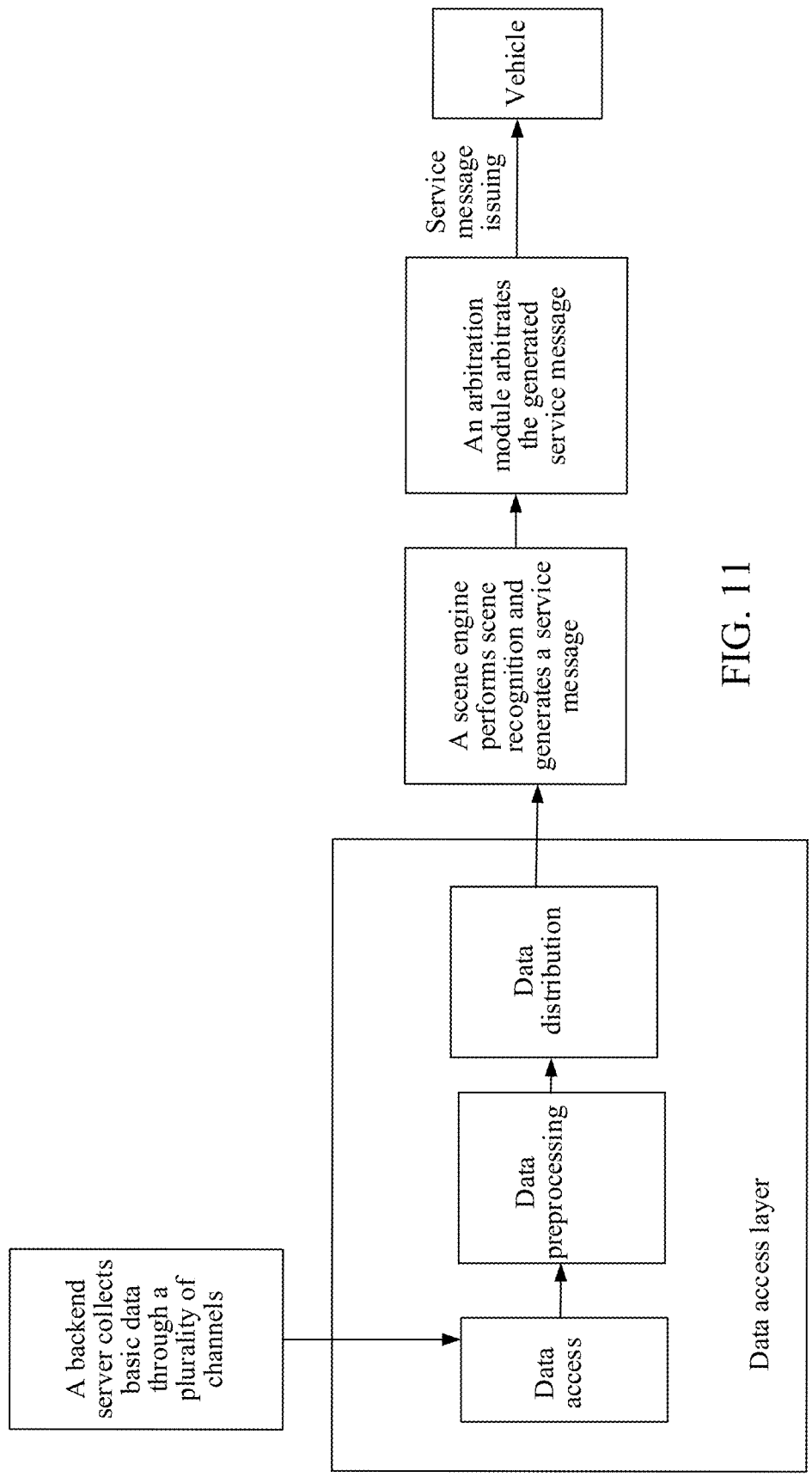
FIG. 11 is a schematic overall execution flowchart of a message pushing method according to an embodiment of this disclosure.

In another embodiment, an overall execution procedure of this embodiment of this disclosure is concluded below with reference to FIG. 11, and the execution procedure includes the following steps:

Step 1101. A backend server collects basic data related to a vehicle through a plurality of channels.

In this embodiment of this disclosure, the backend server may acquire data from an application software client of the vehicle side, or may acquire data in a buried point manner, or may acquire data through a persistent connection, or may acquire data through a service. This is not specifically limited in this embodiment of this disclosure.

Step 1102. A data access layer accesses the collected basic data and preprocesses the collected basic data.

The preprocessing process includes, but is not limited to: data verification, event uniform encapsulation, and asynchronous message synchronization. This is not specifically limited in this embodiment of this disclosure.

Step 1103. The data access layer distributes, through a registration center, the preprocessed basic data to different scene engines according to types of data to which the scene engines subscribe.

Step 1104. Call, for each scene engine, a functional module in a public service layer to perform scene recognition based on the distributed basic data, and determine, based on the scenes recognized by the scene engines, at least one service currently suitable for or relevant to the target vehicle, and generate a service message of the at least one service.

Step 1105. An arbitration module arbitrates the generated service message and pushes the generated service message to the vehicle side.

Step 1106. The vehicle side displays the received service message.

In an exemplary implementation, all data exchanges involved in this embodiment of this disclosure are asynchronous, that is, all the data is exchanged in the form of asynchronous messages.

According to the method provided in this embodiment of this disclosure, basic data associated with a vehicle is actively obtained, and after the obtained basic data is preprocessed by a data access layer, the data access layer may distribute, according to types of data to which scene engines subscribe, the basic data to different scene engines for scene recognition. After at least one service currently suitable for or relevant to a target vehicle is determined according to scenes recognized by the scene engines, a service message of the at least one service is automatically generated, and the generated service message is actively pushed to the vehicle according to this embodiment of this disclosure. According to the embodiments of this disclosure, active scene recognition is implemented, possible services suitable for or relevant to a user in a current time and space can be actively determined based on a scene recognition result, and a corresponding service message is actively pushed to a vehicle side. The user may enjoy required or relevant services without additional operations, thereby greatly improving driving safety in a vehicular environment and satisfying service demands of the user in the vehicular environment. That is, according to this embodiment of this disclosure, scene perception is performed by using scene engines, thereby actively providing an accurate pushing service for the vehicle-side user.

In addition, according to this embodiment of this disclosure, the scene recognition is completed by the server side, thus not only providing powerful scene perceptibility, that is, diversified services, but also providing powerful scene expandability. Specifically, as the services become more abundant, the server side can provide more scene engines without changing the current architecture, that is, the interaction framework provided in this embodiment of this disclosure can rapidly expand the scene engines without affecting capability outputs of other scene engines.

In addition, according to this embodiment of this disclosure, fast adaptability of multi-tenancy is provided: through configuration, the same service capability can cater for different vehicle scene requirements without version iteration. That is, this embodiment of this disclosure can adapt to vehicle scenes with different demands, and can cater for vehicle scenes with different demands.

Figure 12:
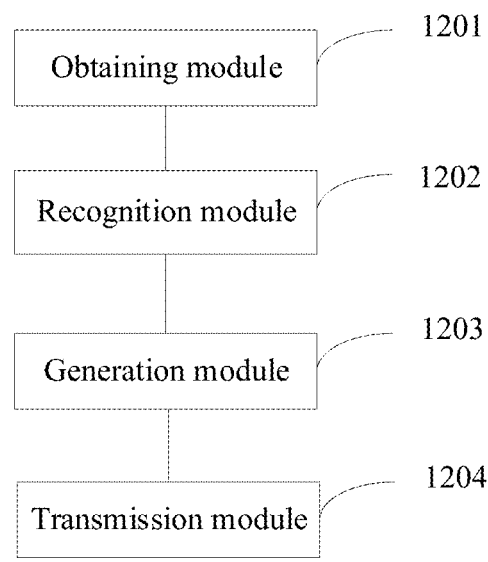
FIG. 12 is a schematic structural diagram of a message pushing apparatus according to an embodiment of this disclosure.

FIG. 12 is a schematic structural diagram of a message pushing apparatus according to an embodiment of this disclosure, and the apparatus is applicable to a server. Referring to FIG. 12, the apparatus includes:

an obtaining module 1201, configured to obtain basic data associated with a target vehicle, the basic data including at least vehicle and user data and driving environment data;

a recognition module 1202, configured to recognize a current scene of the target vehicle based on the obtained basic data;

a generation module 1203, configured to determine, according to an obtained scene recognition result, at least one service currently suitable for or relevant to the target vehicle, and generate a service message of the at least one service; and a transmission module 1204, configured to push the generated service message to the target vehicle.

According to this embodiment of this disclosure, the apparatus actively obtains basic data associated with a vehicle, and actively recognizes a current scene of a target vehicle based on the obtained basic data, the basic data including at least vehicle and user data and driving environment data. After determining at least one service currently suitable for or relevant to the target vehicle according to an obtained scene recognition result, the apparatus automatically generates a service message of the at least one service, and actively pushes the generated service message to the vehicle. According to the embodiments of this disclosure, active scene recognition is implemented, possible services suitable for or relevant to a user in a current time and space can be actively determined based on a scene recognition result, and a corresponding service message is actively pushed to a vehicle side. The user may enjoy required or relevant services without additional operations, thereby greatly improving driving safety in a vehicular environment and satisfying service demands of the user in the vehicular environment, which has better effects.

In an exemplary implementation, the generation module 1203 is configured to determine the at least one service according to the obtained scene recognition result, each service of the at least one service having a different service type; and generate service cards matching the services, one service card including a service message of one service.

In an exemplary implementation, the transmission module 1204 is configured to select service cards of at least two different service types from the generated service cards according to a priority rule and push the selected service cards to the target vehicle; push a service card in highest demand in the current scene to the target vehicle; and push the generated service cards to the target vehicle successively at a target frequency interval according to the priority rule, the priority rule being that a service card in higher demand in the current scene has a higher priority.

In an exemplary implementation, the recognition module 1202 is configured to call a functional module in a public service layer to recognize the current scene of the target vehicle based on the obtained basic data.

In an exemplary implementation, the recognition module 1202 is configured to input the obtained basic data to a machine learning model of a model service module, and recognize the current scene of the target vehicle based on the machine learning model; detect, based on a rule configuration module, whether the obtained basic data satisfies a preset rule, and recognize the current scene of the target vehicle based on an obtained detection result; recognize the current scene of the target vehicle based on the obtained basic data and a portrait matching the basic data, the portrait being constructed based on historical basic data associated with the target vehicle; and call a content service module to obtain designated basic data matching a current time and space based on the obtained basic data and recognize the current scene of the target vehicle based on the designated basic data.

In an exemplary implementation, the recognition module 1202 is further configured to distribute the obtained basic data to different scene engines for scene recognition, basic data received by each scene engine matching a type of data to which the scene engine subscribes in advance; and use scenes recognized by the scene engines as the scene recognition result.

In an exemplary implementation, the recognition module 1202 is configured to verify the basic data distributed for each scene engine; and create a plurality of threads after the verification, and call, by using the plurality of threads, a functional module in a public service layer to recognize the current scene of the target vehicle based on the obtained basic data.

In an exemplary implementation, the generation module 1203 is configured to determine at least one scene having a service demand currently from the scenes recognized by the scene engines; determine a service matching the at least one scene according to a correspondence between scenes and services; and determine the service matching the at least one scene as the at least one service.

In an exemplary implementation, the recognition module 1202 is further configured to preprocess the obtained basic data; and distribute preprocessed basic data to different scene engines.

In an exemplary implementation, the transmission module 1204 is further configured to determine, according to a priority rule, a target service message from service messages generated by at least two scene engines, and push the target service message to the target vehicle, the target service message being a service message in highest demand in the current scene;

push, according to the priority rule, the service messages generated by the at least two scene engines to the target vehicle successively at a target frequency interval;

push, according to the priority rule, some service messages in the service messages generated by the at least two scene engines to the target vehicle successively at the target frequency interval; and push, in response to that one scene engine generates at least two service messages, the at least two service messages to the target vehicle at the target frequency interval, the priority rule being that a service message in higher demand in the current scene has a higher priority.

In an exemplary implementation, the obtaining module 1201 is further configured to obtain a message display template matching the generated service message.

The transmission module 1204 is further configured to transmit the message display template to the target vehicle, the message display template being used for instructing the target vehicle to display the received service message according to the message display template.

In an exemplary implementation, the vehicle and user data includes vehicle data and user data;

the vehicle data includes at least vehicle state data and track data; the user data includes at least user behavior data, user preference data, and resource label data of a vehicle-side user; and the driving environment data includes at least road condition data, weather environment data, POI data, and infrastructure data.

In an exemplary implementation, a portrait matching the basic data includes a user portrait, a vehicle portrait, an environment portrait, and a content portrait, the environment portrait being constructed according to historical weather environment data and updated by using weather environment data obtained in real time, the vehicle portrait being constructed according to historical vehicle state data and updated by using vehicle state data obtained in real time, the user portrait being constructed according to historical user behavior data and historical user preference data and updated by using user behavior data and user preference data obtained in real time, and the content portrait being constructed according to historical resource label data and updated by using resource label data obtained in real time.

Any combination of the foregoing optional technical solutions may be used to form an optional embodiment of this disclosure. Details are not described herein again.

When the message pushing apparatus provided in the foregoing embodiment pushes a message, the foregoing division of the functional modules is merely an example for description. During actual application, the foregoing functions may be allocated to and completed by different functional modules according to requirements, that is, the internal structure of the apparatus is divided into different functional modules, to complete all or some of the foregoing described functions. In addition, the message pushing apparatus provided in the foregoing embodiments and the message pushing method embodiments fall within the same conception. For details of a specific implementation process, refer to the method embodiments. Details are not described again herein.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 13:
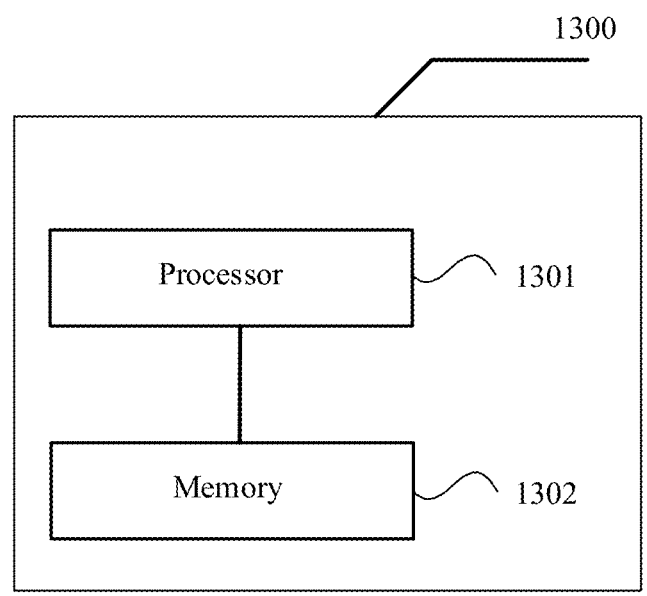
FIG. 13 is a schematic diagram of a server 1300 according to an embodiment of this disclosure.

FIG. 13 is a schematic structural diagram of a server according to an embodiment of this disclosure. The server 1300 may vary greatly due to different configurations or performance, and may include one or more processors (such as central processing units (CPUs)) 1301 and one or more memories 1302. The memory 1302 stores at least one instruction, the at least one instruction being loaded and executed by the processor 1301 to implement the message pushing method provided in the foregoing method embodiments. Certainly, the server can also have a wired or wireless network interface, a keyboard, an I/O interface and other components to facilitate I/O. The server can also include other components for implementing device functions. Details are not described herein again.

In an exemplary embodiment, a computer-readable storage medium, for example, a memory including instructions, is further provided. The instructions may be executed by the processor in the terminal to implement the message pushing method in the foregoing embodiment. For example, the computer-readable storage medium may be a ROM, a random access memory (RAM), a CD-ROM, a magnetic tape, a floppy disk, an optical data storage device, or the like.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely exemplary embodiments of this disclosure, and are not intended to limit this disclosure. Any modification, equivalent replacement, improvement, and the like made within the spirit and principle of this disclosure shall fall within the protection scope of this disclosure.

What is claimed is:

1. A message pushing method, applicable to a server, the method comprising:
    obtaining basic data associated with a target vehicle, the basic data comprising at least vehicle and user data and driving environment data;
    recognizing a current scene of the target vehicle based on the basic data to obtain a scene recognition result by:
        distributing the basic data to at least two scene engines, basic data received by each scene engine matching a type of data to which the at least two scene engines subscribe in advance; and
        using the at least two scene engines to perform scene recognition to obtain the scene recognition result;
    determining, according to the scene recognition result, at least one recommended service for the target vehicle;
    generating at least one service message of the at least one recommended service; and
    pushing the at least one service message to the target vehicle by pushing, in response to that one scene engine generates at least two candidate service messages, the at least two candidate service messages to the target vehicle at a target frequency interval in an order prioritized, according to a demand in the current scene, by a priority rule.

2. The method according to claim 1, wherein:
each of the at least one recommended service has a different service type; and
generating the at least one service message of the at least one recommended service comprises generating a service card matching each corresponding recommended service, the service card comprising the at least one service message of the corresponding recommended service.

3. The method according to claim 1, wherein recognizing the current scene of the target vehicle based on the basic data comprises:
recognizing the current scene of the target vehicle based on the basic data by a functional module in a public service layer.

4. The method according to claim 3, wherein recognizing the current scene of the target vehicle based on the basic data by the functional module in the public service layer comprises at least one of the following:
recognizing the current scene of the target vehicle based on a machine learning model of a model service module by providing the basic data to the machine learning model;
recognizing the current scene of the target vehicle based on a detection result obtained by detecting, based on a rule configuration module, whether the basic data satisfies a preset rule;
recognizing the current scene of the target vehicle based on the basic data and a portrait matching the basic data, the portrait being constructed based on historical basic data associated with the target vehicle; or
recognizing the current scene of the target vehicle based on designated basic data matching a current time and space, the designated basic data being obtain from a content service module.

5. The method according to claim 1, wherein distributing the basic data to the at least two scene engines comprises:
verifying the distributed basic data for each scene engine;
creating a plurality of threads after the verification; and
calling, by using the plurality of threads, a functional module in a public service layer to recognize the current scene of the target vehicle based on the distributed basic data.

6. The method according to claim 1, wherein determining, according to the scene recognition result, the at least one recommended service for the target vehicle comprises:
determining at least one scene matching a service demand currently exists among the scenes recognized by the scene engines;
determining a service matching the at least one scene according to a correspondence between scenes and services; and
determining the service matching the at least one scene as the at least one recommended service.

7. The method according to claim 1, wherein the method further comprises:
obtaining a message display template matching the generated at least one service message; and
transmitting the message display template to the target vehicle to instruct the target vehicle to display the at least one service message in a form of a service card according to the message display template.

8. The method according to claim 1, wherein:
the vehicle and user data comprises vehicle data and user data;
the vehicle data comprises vehicle state data and track data;
the user data comprises user behavior data, user preference data, and resource label data of a vehicle-side user; and
the driving environment data comprises road condition data, weather environment data, point of interest data, and infrastructure data.

9. The method according to claim 8, wherein recognizing the current scene of the target vehicle based on the basic data to obtain the scene recognition result comprises recognizing the current scene of the target vehicle based on the basic data and a portrait matching the basic data, wherein:
the portrait matching the basic data comprises a user portrait, a vehicle portrait, an environment portrait, and a content portrait;
the environment portrait is constructed according to historical weather environment data and updated by using weather environment data obtained in real time;
the vehicle portrait is constructed according to historical vehicle state data and updated by using vehicle state data obtained in real time;
the user portrait is constructed according to historical user behavior data and historical user preference data and updated by using user behavior data and user preference data obtained in real time; and
the content portrait is constructed according to historical resource label data and updated by using resource label data obtained in real time.

10. The method according to claim 1, wherein distributing the basic data to the at least two scene engines comprises distributing the basic data from an agent of which the at a least two scene engines are subscriber.

11. The method according to claim 1, wherein the at least one processor is configured to determine, according to the scene recognition result, the at least one recommended service for the target vehicle by:
determining at least one scene matching a service demand currently exists among the scenes recognized by the scene engines;
determining a service matching the at least one scene according to a correspondence between scenes and services; and
determining the service matching the at least one scene as the at least one recommended service.

12. A non-transitory computer-readable storage medium, storing at least one instruction, the instruction, when being loaded and executed by at least one processor, causing an electronic device to:
obtain basic data associated with a target vehicle, the basic data comprising at least vehicle and user data and driving environment data;
recognize a current scene of the target vehicle based on the basic data to obtain a scene recognition result by:
distributing the basic data to at least two scene engines, basic data received by each scene engine matching a type of data to which the at least two scene engines subscribe in advance; and
using the at least two scene engines to perform scene recognition to obtain the scene recognition result;
determine, according to the scene recognition result, at least one recommended service for the target vehicle;
generate at least one service message of the at least one recommended service; and
push the at least one service message to the target vehicle by pushing, in response to that one scene engine generates at least two candidate service messages, the at least two candidate service messages to the target vehicle at a target frequency interval in an order prioritized, according to a demand in the current scene, by a priority rule.

13. The non-transitory computer-readable storage medium according to claim 12, wherein distributing the basic data to the at least two scene engines comprises distributing the basic data from an agent of which the at a least two scene engines are subscriber.

14. A server, comprising at least one processor and a memory, the memory storing at least one instruction, the at least one processor being configured to execute the at least one instruction to cause the server to:
   obtain basic data associated with a target vehicle, the basic data comprising at least vehicle and user data and driving environment data;
   recognize a current scene of the target vehicle based on the basic data to obtain a scene recognition result by:
      distributing the basic data to at least two scene engines, basic data received by each scene engine matching a type of data to which the at least two scenes engine subscribe in advance; and
      using the at least two scene engines to perform scene recognition to obtain the scene recognition result;
   determine, according to the scene recognition result, at least one recommended service for the target vehicle;
   generate at least one service message of the at least one recommended service; and
   push the at least one service message to the target vehicle by pushing, in response to that one scene engine generates at least two candidate service messages, the at least two candidate service messages to the target vehicle at a target frequency interval in an order prioritized, according to a demand in the current scene, by a priority rule.

15. The server according to claim 14, wherein:
   each of the at least one recommended service has a different service type; and
   the at least one processor is further configured to execute the at least one instruction to cause the server to generate the at least one service message of the at least one recommended service by performing the step, comprising: generating a service card matching each corresponding recommended service, each of the service card comprising a service message of the corresponding recommended service.

16. The server according to claim 14, wherein the at least one processor is further configured to execute the at least one instruction to cause the server to recognize the current scene of the target vehicle based on the basic data by performing the step, comprising:
   recognizing the current scene of the target vehicle based on the basic data by a functional module in a public service layer.

17. The server according to claim 16, wherein the at least one processor is further configured to execute the at least one instruction to cause the server to recognize the current scene of the target vehicle based on the basic data by the functional module in the public service layer by performing at least one of the following steps:
   recognizing the current scene of the target vehicle based on a machine learning model of a model service module by providing the basic data to the machine learning model;
   recognizing the current scene of the target vehicle based on a detection result obtained by detecting, based on a rule configuration module, whether the basic data satisfies a preset rule;
   recognizing the current scene of the target vehicle based on the basic data and a portrait matching the basic data, the portrait being constructed based on historical basic data associated with the target vehicle; or
   recognizing the current scene of the target vehicle based on designated basic data matching a current time and space, the designated basic data being obtain from a content service module.

18. The server according to claim 14, wherein the at least one processor is further configured to execute the at least one instruction to cause the server to:
   obtain a message display template matching the generated at least one service message; and
   transmit the message display template to the target vehicle to instruct the target vehicle to display the at least one service message in a form of a service card according to the message display template.

19. The server according to claim 14, wherein the at least one processor is configured to distribute the basic data to the at least two scene engines by distributing the basic data from an agent of which the at a least two scene engines are subscriber.

20. The server according to claim 14, wherein the at least one processor is configured to distribute the basic data to the at least two scene engines by:
   verifying the distributed basic data for each scene engine;
   creating a plurality of threads after the verification; and
   calling, by using the plurality of threads, a functional module in a public service layer to recognize the current scene of the target vehicle based on the distributed basic data.

* * * * *